United States Patent
Lazaridis et al.

(10) Patent No.: US 9,747,003 B2
(45) Date of Patent: Aug. 29, 2017

(54) MULTIPLE-STAGE INTERFACE CONTROL OF A MOBILE ELECTRONIC DEVICE

(71) Applicants: BlackBerry Limited, Waterloo (CA); 2236008 Ontario Inc., Waterloo (CA)

(72) Inventors: Mihal Lazaridis, Waterloo (CA); Donald James Lindsay, Mountain View, CA (US); Todd Andrew Wood, Toronto (CA); Jason Tyler Griffin, Kitchener (CA); Alistair Robert Hamilton, Sammamish, WA (US); Robert Daniel Payne, St. Clements (CA); Andrew Douglas Bocking, Conestogo (CA); Daniel Tobias Rydenhag, Gothenburg (SE); Joseph Eytan Benedek, Thornhill (CA); Danny Thomas Dodge, Ottawa (CA)

(73) Assignees: BlackBerry Limited, Waterloo (CA); 2236008 Ontario Inc., Waterloo (CA)

( * ) Notice: Subject to any disclaimer, the term of this patent is extended or adjusted under 35 U.S.C. 154(b) by 148 days.

(21) Appl. No.: 13/706,782

(22) Filed: Dec. 6, 2012

(65) Prior Publication Data
US 2014/0040768 A1    Feb. 6, 2014

Related U.S. Application Data

(60) Provisional application No. 61/678,388, filed on Aug. 1, 2012.

(51) Int. Cl.
*G06F 3/048* (2013.01)
*G06F 3/0483* (2013.01)
(Continued)

(52) U.S. Cl.
CPC .......... *G06F 3/0483* (2013.01); *G06F 3/0482* (2013.01); *G06F 3/04883* (2013.01); *H04M 1/72519* (2013.01); *H04M 2250/22* (2013.01)

(58) Field of Classification Search
CPC ....... G06F 2203/04803; G06F 3/04842; G06F 3/0482; G06F 3/04817; G06F 3/0488;
(Continued)

(56) References Cited

U.S. PATENT DOCUMENTS

| 7,246,329 | B1 | 7/2007 | Miura et al. |
| 8,020,105 | B1 * | 9/2011 | Lemay ............ H04L 51/36 709/227 |

(Continued)

FOREIGN PATENT DOCUMENTS

| EP | 2431870 A2 | 3/2012 |
| EP | 2431870 A3 | 1/2013 |
| GB | 2012/000397 | * 11/2012 ............. G06F 3/048 |

OTHER PUBLICATIONS

Apple Inc., "iOS 5 Features that go further," retrieved from http://www.apple.com/ios/features.html, copyright 2011, (pp. 1-12), 12 pages.

(Continued)

*Primary Examiner* — Jaime Duckworth
(74) *Attorney, Agent, or Firm* — Jenna L. Wilson; Wilson Lue LLP

(57) ABSTRACT

An electronic device, such as a mobile communication device, and a method are provided for multiple-stage interface control of the device. The device is provided with a homescreen display, which includes a plurality of panels. The panels include at least one panel that is a fullscreen view of a first application executing on the device. This first application can be a messaging application, and the fullscreen view can be a unified inbox view for a plurality of different message types. The panels also include at least one
(Continued)

launch panel having a number of graphical user interface elements, such as icons, representing access points to a corresponding application on the device.

13 Claims, 22 Drawing Sheets

(51) Int. Cl.
*G06F 3/0488* (2013.01)
*G06F 3/0482* (2013.01)
*H04M 1/725* (2006.01)

(58) Field of Classification Search
CPC ............. G06F 3/04847; G06F 3/04883; G06F 3/0481; G06F 3/04845; G06F 3/0484; G06F 3/048; G06F 3/0483
USPC .......................................................... 715/752
See application file for complete search history.

(56) References Cited

U.S. PATENT DOCUMENTS

| | | | |
|---|---|---|---|
| 8,140,996 | B2 | 3/2012 | Tomkins |
| 8,238,876 | B2 | 8/2012 | Teng et al. |
| 2002/0112007 | A1 | 8/2002 | Wood et al. |
| 2004/0155909 | A1 | 8/2004 | Wagner |
| 2007/0271527 | A1 | 11/2007 | Paas et al. |
| 2008/0059896 | A1 | 3/2008 | Anderson et al. |
| 2008/0153459 | A1 | 6/2008 | Kansal et al. |
| 2009/0007017 | A1 | 1/2009 | Anzures et al. |
| 2009/0228807 | A1 | 9/2009 | Lemay |
| 2010/0001967 | A1 | 1/2010 | Yoo |
| 2010/0269040 | A1 | 10/2010 | Lee |
| 2011/0105187 | A1 | 5/2011 | Dobroth et al. |
| 2011/0167387 | A1 | 7/2011 | Stallings et al. |
| 2011/0179387 | A1 | 7/2011 | Shaffer et al. |
| 2011/0197163 | A1 | 8/2011 | Jegal et al. |
| 2011/0252381 | A1* | 10/2011 | Chaudhri ...................... 715/838 |
| 2012/0071208 | A1 | 3/2012 | Lee et al. |
| 2012/0246592 | A1* | 9/2012 | Yeung .................. G06F 9/4443 715/783 |
| 2012/0304114 | A1* | 11/2012 | Wong et al. .................. 715/800 |
| 2012/0304132 | A1* | 11/2012 | Sareen ................ G06F 3/04883 715/863 |
| 2013/0069893 | A1 | 3/2013 | Brinda et al. |
| 2013/0082945 | A1 | 4/2013 | Jo |
| 2013/0151983 | A1 | 6/2013 | Lovitt et al. |
| 2013/0159900 | A1* | 6/2013 | Pendharkar .............. G09G 5/14 715/765 |
| 2013/0249841 | A1 | 9/2013 | Yang et al. |
| 2013/0321340 | A1 | 12/2013 | Seo et al. |
| 2014/0009421 | A1 | 1/2014 | Lee et al. |
| 2014/0040756 | A1 | 2/2014 | Bukurak et al. |
| 2014/0053116 | A1* | 2/2014 | Smith ................... G06F 9/4443 715/863 |
| 2014/0267120 | A1 | 9/2014 | Zhang et al. |

OTHER PUBLICATIONS

Peraza, Jorge, "Customizing the Sliding Panel Homescreen,"Windows Mobile Team blog, Jun. 3, 2008, retrieved from http://blogs.msdn.com/b/windowsmobile/archive/2008/06/03/customizing-the-sliding-panel-homescreen.aspx, (pp. 1-22), 22 pages.

Apple Inc., "OS X Lion: About Multi-Touch Gestures," Sep. 7, 2011, retrieved from http://support.apple.com/kb/HT4721, (pp. 1-5), 5 pages.

Apple Inc., "iPad User Guide for iOS 5.1 Software", 2012, (pp. 16, 24, 26, 27, 32, 46, 50, 110-111), 144 pages.

Nokia, "Nokia N9 MeeGo Smartphone," Nokia presentation during Nokia Connection 2011, uploaded on Jun. 21, 2011, retrieved from the http://www.youtube.com/watch?v=1weKReXu16Q, entire video, 2 pages.

Nokia, "Multi Tasking Power of MeeGo," uploaded on Jun. 25, 2011, retrieved from http://www.youtube.com/watch?v=hSwD6havouo, entire video, 3 pages.

Nokia, "Nokia N9-MeeGo Awesome Swipe User Interface and Camera UI," uploaded on Jun. 21, 2011, retrieved from http://www.youtube.com/watch?v=Lfv5c59fSds, entire video, 3 pages.

Examination Report dated Dec. 16, 2015 from CA 2,820,993, pp. 1-4.

Apple Inc., "iPhone User Guild for iOS 5.0 Software", Oct. 20, 2011, p. 19.

Extended European Search Report dated Mar. 2, 2016 from EP 13164365.2, pp. 1-7.

Extended European Search Report dated Mar. 2, 2016 from EP 13164364.5, pp. 1-9.

Haslam, Oliver: "'AppLocker' Password Protects Your Individual iOS Apps", Oct. 24, 2011, XP055252019, Retrieved from the Internet: URL:http://www.idownloadblog.com/2011/10/2/4/applocker/ [retrieved on Feb. 22, 2016], pp. 1-5.

\* cited by examiner

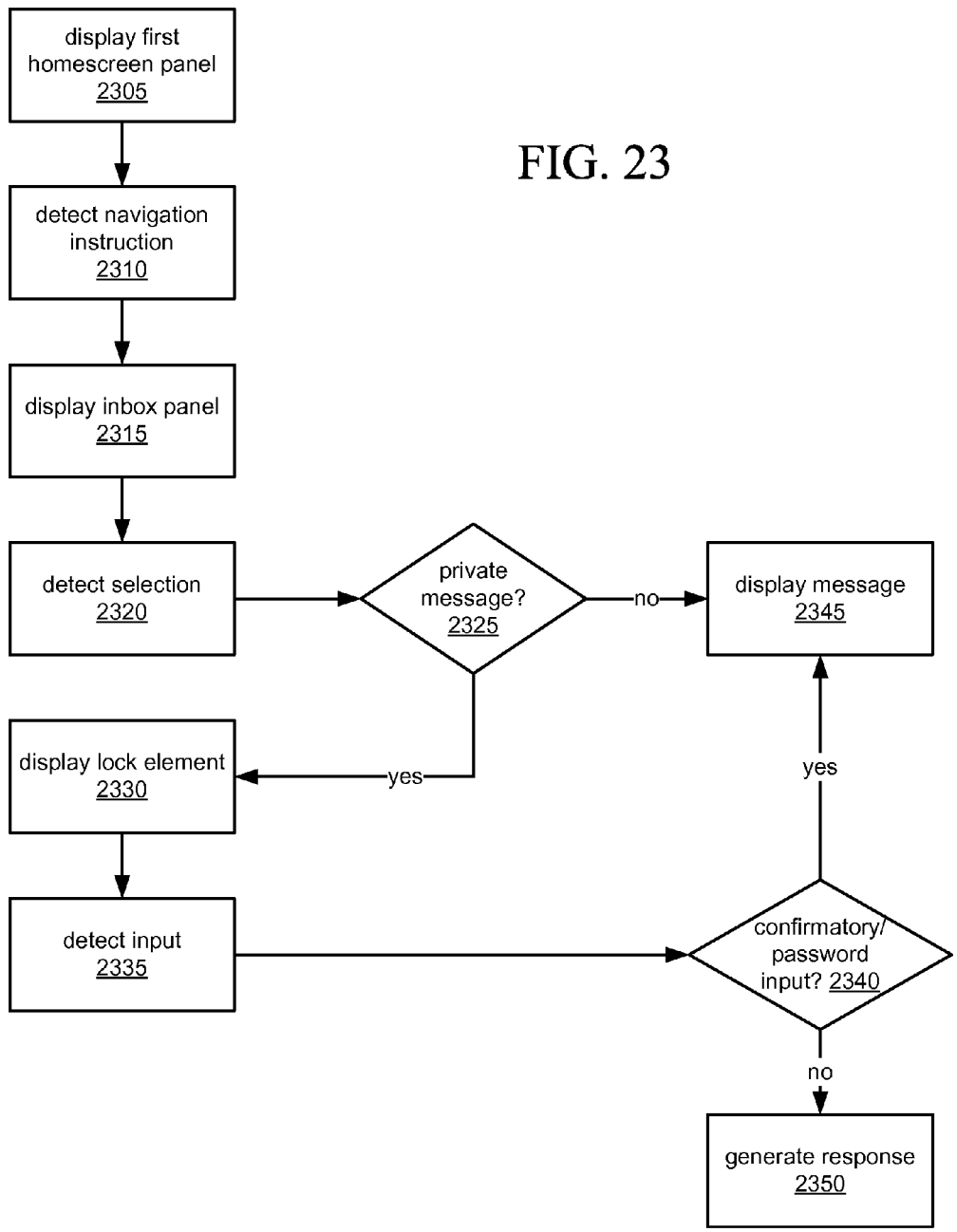

ically in relation to mobile electronic devices, such as tablet computers, smartphones, or any other suitable electronic device provided with sufficient user interface mechanisms as will be understood by those skilled in the art from the following description. It will be appreciated by those skilled
MULTIPLE-STAGE INTERFACE CONTROL OF A MOBILE ELECTRONIC DEVICE

CROSS-REFERENCE TO RELATED APPLICATIONS

This application claims priority to U.S. Provisional Application Ser. No. 61/678,388 filed 1 Aug. 2012, the entirety of which is incorporated herein by reference.

TECHNICAL FIELD

The present disclosure relates to a multiple-stage graphical user interface implemented by an electronic device to provide access to applications and data.

TECHNICAL BACKGROUND

Mobile computing device platforms, such as tablet computers or smartphones, are typically subject to physical limitations that less portable computing platforms, such as desktop computing platforms, are not. Mobile devices, for instance, typically have a smaller form factor and an integrated display screen. These factors may limit the variety of user interface options available for controlling the mobile device: mobile devices are provided with smaller physical keyboards than desktop or laptop computers, or may have no keyboard at all; and the mobile device's display screen, smaller than a typical desktop or laptop display panel, restricts the volume of information that can be simultaneously displayed to the user while still being legible.

Nevertheless, the types of information that can be stored on a mobile device can be just as diverse as the information stored on a desktop or laptop computer with more robust processing capabilities: messages of different types, productivity files, e-books, music and other entertainment products, not to mention the large variety of recreational, productivity and personal interest applications available for mobile computing platforms. All of this information still needs to be presented to the user in a manner that enables the user to locate the desired application or data file efficiently and conveniently.

BRIEF DESCRIPTION OF THE DRAWINGS

In drawings which illustrate by way of example only embodiments of the present disclosure, in which like reference numerals describe similar items throughout the various figures.

FIG. 23 is a flowchart illustrating an example method of navigating a multiple-stage homescreen to access private messages.

DETAILED DESCRIPTION OF THE INVENTION

Figure 1:
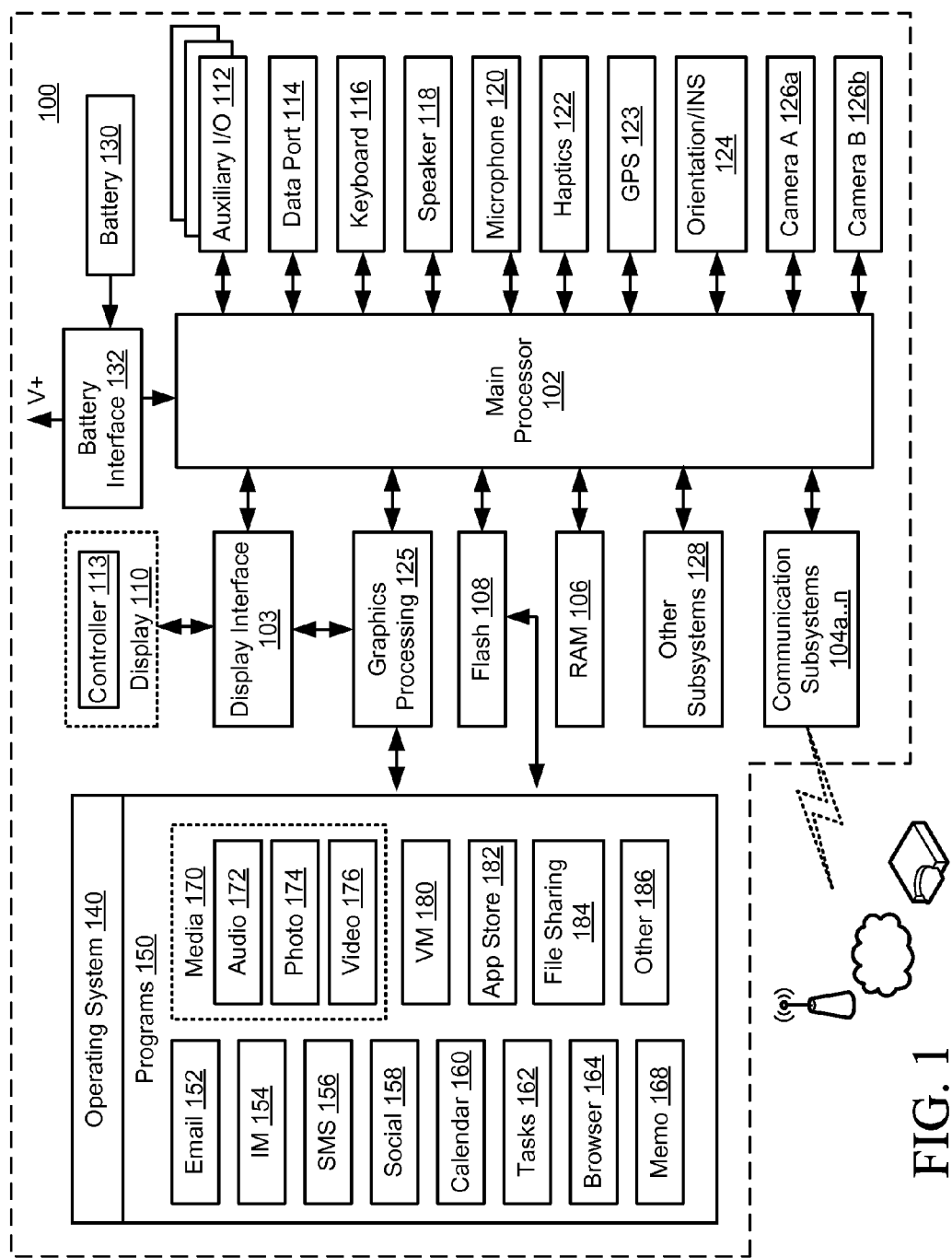
FIG. 1 is a block diagram of an example of an electronic device.

The embodiments and examples described herein provide a device, system and methods for presenting and accessing multiple portions of a homescreen implemented on a mobile device, such as a tablet or smartphone, in which the homescreen includes an integrated application view such as a unified message inbox view. These examples may in particular be implemented on mobile devices adapted to normally execute applications in a fullscreen view and normally displaying, as a main display or view, a launchpad-style homescreen or landing screen. These examples will be described generally with reference to a touchscreen-based device, although variations and modifications appropriate to non-touchscreen-based devices will be known to those skilled in the art.

These embodiments are described and illustrated primarily in relation to mobile electronic devices, such as tablet computers, smartphones, or any other suitable electronic device provided with sufficient user interface mechanisms as will be understood by those skilled in the art from the following description. It will be appreciated by those skilled in the art, however, that this description is not intended to limit the scope of the described embodiments to implementation on mobile or portable devices, or on tablets or smartphones in particular. For example, the methods and systems described herein may be applied to any appropriate communication device or data processing device adapted with suitable user interface mechanisms, whether or not the device is adapted to communicate with another communication or data processing device using a network communication interface adapted to communicate over a fixed or wireless connection, whether provided with voice communication capabilities or not, and whether portable or not. The device may be additionally or alternatively adapted to process data and carry out operations on data in response to user commands for any number of purposes, including productivity and entertainment. In some examples, data may be accessed from a different device. Therefore, the examples described herein may be implemented in whole or in part on electronic devices including without limitation cellular phones, smartphones, wireless organizers, personal digital assistants, desktop computers, terminals, laptops, tablets, e-book readers, handheld wireless communication devices, notebook computers, portable gaming devices, tabletop displays, Internet-connected televisions, set-top boxes, digital picture frames, digital cameras, in-vehicle entertainment systems, entertainment devices such as MP3 or video players, and the like.

In the primary examples described herein, the electronic device includes an integrated touchscreen display; however, it will be readily understood by those skilled in the art that a touchscreen display is not necessary. In some cases, the electronic device may have an integrated display that is not touchscreen-enabled. In other cases, the electronic device (whether it possesses an integrated display or not) may be configured to output data to be painted to an external display unit such as an external monitor or panel, tablet, television screen, projector, or virtual retinal display (via a data port or transmitter, such as a Bluetooth® transceiver, USB port, HDMI port, DVI port, and the like). For such devices, references herein to a "display," "display screen" or "display interface" are intended to encompass both integrated and external display units.

FIG. 1 is a block diagram of an example of a portable electronic device 100 that may be used with the embodiments described herein. It should be understood that the components described in FIG. 1 are optional and that an electronic device used with various embodiments described herein may include or omit components described in relation to FIG. 1. The electronic device 100 includes a number of components such as a main processor 102 that controls the device's overall operation. Other processors or components can be included for functions not explicitly detailed herein, such as power management and conversion, encoding and decoding of audio and other data, and the like. Those skilled in the part will appreciate that such components, if present, are not illustrated here for ease of exposition.

The electronic device 100 may be a battery-powered device, having a battery interface 132 for receiving one or more batteries 130. Alternatively or additionally, the electronic device 100 may be provided with an external power supply (e.g., mains power, using a suitable adapter as necessary). If configured for communication functions, such as data or voice communications, one or more communication subsystems 104a . . . n in communication with the processor are included. Data received by the electronic device 100 can be received via one of these subsystems and decompressed and/or decrypted as necessary using techniques and components known to persons of skill in the art. The communication subsystems 104a . . . n typically include a receiver, transmitter, and associated components such as one or more embedded or internal antenna elements, local oscillators, and a digital signal processor in communication with the transmitter and receiver. The particular design of the communication subsystems 104a . . . n is dependent upon the communication network with which the subsystem is intended to operate.

For example, data may be communicated to and from the electronic device 100 using a wireless communication subsystem 104a over a wireless network. In this example, the wireless communication subsystem 104a is configured in accordance with one or more wireless communications standards. New wireless communications standards are still being defined, but it is believed that they will have similarities to the network behaviour described herein, and it will also be understood by persons skilled in the art that the embodiments described herein are intended to use any other suitable standards that are developed in the future. The wireless link connecting the wireless communication subsystem 104a with the wireless network represents one or more different Radio Frequency (RF) channels, operating according to defined protocols specified for the wireless communications standard, and optionally other network communications.

The electronic device 100 may be provided with other communication subsystems, such as a wireless LAN (WLAN) communication subsystem 104b or a short-range and/or near-field communications subsystem 104c. The WLAN communication subsystem 104b may operate in accordance with a known network protocol such as one or more of the 802.11™ family of standards developed or maintained by IEEE. The communications subsystems 104b and 104c provide for communication between the electronic device 100 and different systems or devices without the use of the wireless network, over varying distances that may be less than the distance over which the communication subsystem 104a can communicate with the wireless network. The subsystem 104c can include an infrared device and associated circuits and/or other components for short-range or near-field communication.

It should be understood that integration of any of the communication subsystems 104a . . . n within the device chassis itself is optional. Alternatively, one or more of the communication subsystem may be provided by a dongle or other peripheral device (not shown) connected to the electronic device 100, either wirelessly or by a fixed connection (for example, by a USB port) to provide the electronic device 100 with wireless communication capabilities. If provided onboard the electronic device 100, the communication subsystems 104a . . . n may be separate from, or integrated with, each other.

The main processor 102 also interacts with additional subsystems (if present), the general configuration and implementation of which will be known to those skilled in the art, such as a Random Access Memory (RAM) 106, a flash memory 108, a display interface 103 and optionally a display 110, other data and memory access interfaces such as a visualization (graphics) processor 125, auxiliary input/output systems 112, one or more data ports 114, a keyboard 116, speaker 118, microphone 120, haptics module 122 (e.g., a driver and a vibratory component, such as a motor), GPS or other location tracking module 123, orientation and/or inertial navigation system (INS) module 124, one or more cameras, indicated at 126a and 126b and other subsystems 128. In some cases, zero, one or more of each of these various subsystems may be provided, and some subsystem functions may be provided by software, hardware, or a combination of both. For example, a physical keyboard 116 may not be provided integrated with the device 100; instead a virtual keyboard may be implemented for those devices 100 bearing touch screens, using software components executing at the device. Additional display interfaces 103 or displays 110 may be provided, as well as additional dedicated processors besides the visualization processor 125 to execute computations that would otherwise be executed by the host processor 102. Additional memory or storage modules, not shown in FIG. 1, may also be provided for storing data, which can contain flash memory modules as well. Examples include non-volatile memory cards such in the microSD and miniSD formats defined by the SD Association, San Ramon, Calif. Such storage modules may communicate with the mobile device 100 using a fixed or wireless connection.

A visualization (graphics) processor or module 125 may be included in the electronic device 100. The visualization module 125 analyzes and processes data for presentation via the display interface 103 and display 110. Data originally prepared for visualization on a large-screen display may require additional processing prior to visualization on a small-screen display. This additional processing may be accomplished by the visualization module 125. As will be appreciated by those of skill in the art, the visualization module can be implemented in hardware, software, or a combination thereof, and can include a dedicated image processor and associated circuitry, or can be implemented within main processor 102. Rendered data for painting to the display is provided to the display 110 (whether the display 110 is external to the device 100, or integrated) via the display interface 103.

Content that is rendered for display may be obtained from a document such as a message, word processor document, webpage, or similar file, which is either obtained from memory at the device such as flash memory 108 or RAM 106, or obtained over a network connection. A suitable application, such as a messaging application, viewer application, or browser application, or other suitable application, can process and render the document for display in accordance with any formatting or stylistic directives included with the document. FIG. 1 illustrates possible components of the device 100, such as the operating system 140 and programs 150, which can include zero, one or more applications such as those depicted. Other software components 190 besides those explicitly illustrated in FIG. 1 can also be included, as is well known to those skilled in the art. Programs 150 may be installed on the device 100 during its manufacture or together with loading of the operating system 140, or at a subsequent time once the device 100 is delivered to the user. These software applications may be supplied by the device manufacturer or operating system provider, or may be third party applications. The additional applications can be loaded onto the device 100 through at least one of the communications subsystems 104a . . . n, the data port 114, or any other suitable device subsystem 128.

Example applications include an email messaging application 152, as well as other types of messaging applications for instant messaging (IM) 154 and Short Message Service (SMS 156). Other applications for messaging can be included as well, and multiple applications for each type of message format may be loaded onto the device 100; there may be, for example, multiple email messaging applications 152 and multiple instant messaging applications 154, each associated with a different user account or server. Alternatively different applications may be provided to access the same set of messages or message types; for example, a unified message box function or application may be provided on the device 100 that lists messages received at and/or sent from the device, regardless of message format or messaging account. Unified messaging or unified inbox applications and functions are discussed in further detail below. Other applications include social networking applications 158, which may provide messaging function, a content reader function, or both; browser applications 164; calendar applications 160, task applications 162 and memo applications 168, which may permit the user of the device 100 to create or receive files or data items for use in personal organization; media applications 170, which can include separate components for playback, recording and/or editing of audio files 172 (including playlists), photographs 174, and video files 176; virtual machines 180, which when executing provide discrete runtime environments for other code on the device 100; "app store" applications 182 for accessing vendor sites offering software applications for download (and optionally for purchase) to the device 100; direct or peer-to-peer file sharing or synchronization applications 184 for managing transfer of files between the device 100 and another device or server such as a synchronization or hosting service, using any suitable protocol; and other applications 186. Applications may store data in the device's file system; however, a dedicated data store or data structure may be defined for each application.

In some examples, the electronic device 100 may be a touchscreen-based device, in which the display 110 includes a touchscreen interface that provides both a display visual presentation of data and graphical user interfaces, and an input subsystem for detecting user input via a graphical user interface presented on the display 110 that may be converted to instructions for execution by the device 100. A display 110 that is a touchscreen may be the principal user interface provided on the electronic device 100, in which case other user input mechanisms such as the keyboard 116 may not be present, although in some examples, a keyboard 116 and/or additional buttons, a trackpad or other user interface mechanisms may still be provided.

Generally, user interface (UI) mechanisms may be implemented at the electronic device 100 as hardware, software, or a combination of both hardware and software. Graphical user interfaces (GUIs), mentioned above, are implemented using the display interface 103 and display 100 and corresponding software executed at the device. Touch UIs are implemented using a touch sensing mechanism, such as the aforementioned trackpad and/or touchscreen interface, along with appropriate software used to convert touch information to signals or instructions. A voice or speech UI can be implemented using the microphone 120, together with modules implemented in hardware or software operable to detect speech patterns or other sounds, and to decode or correlate detected sounds to user commands. A tracking (e.g., eye-tracking or facial tracking) UI or perceptual UI can be implemented using the camera 126a and/or 126b, again with appropriate hardware and/or software modules to analyze received visual data to detect the presence or position of a user's face or eyes, which are used to derive commands or contextual information to control device operations. A kinetic UI can be implemented using the device's orientation/INS module 124, or using the GPS module 123 or another locating technology module, together with appropriate software and/or hardware modules to detect the motion or position of the electronic device 100, again to derive commands or contextual information to control the device. Generally, the implementation of touch, voice, tracking/perceptual, and kinetic UIs will be understood by those skilled in the art.

In touchscreen embodiments, the display controller 113 and/or the processor 102 may detect a touch by any suitable contact member on the touch-sensitive display interface 110 (references to the "display 110" herein include a touchscreen display, for those electronic devices implemented with touchscreen interfaces). The configuration of the touchscreen display and display controller for detecting touches will be known to those skilled in the art. As only one example, the touchscreen display may be a capacitive touchscreen display with a capacitive touch-sensitive overlay having multiple layers including, for example, a substrate, a ground shield layer, a barrier layer, one or more capacitive touch sensor layers separated by a substrate or other barrier, and a cover. The capacitive touch sensor layers may be any suitable material, such as patterned indium tin oxide (ITO). Optionally, haptic or tactile feedback can be provided by the haptics module 122 in response to detected touches received through the touchscreen display, either through the housing of the device 100, or through the touchscreen itself. The touchscreen sensors may be capable of detecting and supporting single-touch, multi-touch, or both single and multi-touch actions such as tap, double-tap, tap and hold, tap and drag, scroll, press, flick and pinch. A touchscreen enabled to detect only single-touch input is able to accurately identify only one point of contact on the display at a time. A multi-touch touchscreen is able to accurately identify two or more simultaneous contacts on the screen. The touchscreen display 110 detects these single and multi-touch actions, for example through the generation of a signal or signals in response to a detected contact, which may then be processed by the processor 102 or by an additional processor or processors in the device 100 to determine attributes of the touch event, such as the location of the touch action, whether defined by horizontal and vertical screen position data or other position data. The detected touch actions may then be correlated both to user commands and to an element or elements displayed on the display screen or view presented by the display 110. In response to the user command, the processor may take actions with respect to the identified element or elements. Touches that are capable of being detected may be made by various contact objects, such as thumbs, fingers, appendages, styli, pens, pointers and the like, although the selection of the appropriate contact object and its construction will depend on the type of touchscreen implemented on the device.

The orientation/INS module 124 can include one or more motion or tilt sensors capable of detecting gravity- or motion-induced forces to determine physical conditions of the device such as acceleration and angular velocity, which in turn can be used to determine the orientation or geometric attitude of the mobile device 100, or changes thereto, in two or three dimensions. Motion sensors can include an accelerometer for detection of linear motion, and a gyroscope for detection of rotational motion. The selection and implementation of suitable motion sensors will be understood by those skilled in the art.

Although not shown in FIG. 1, the electronic device 100 may also include one or more proximity sensors which can be used to determine distance of the device 100 from a surface. An example of a proximity sensor is a radiation sensor for detecting reflected radiation, such as infrared light, from a nearby surface. Such a sensor may typically be used in conjunction with voice or video communication functions on the device 100 to determine when the user is present in front of or in close proximity to the display 110.

Possible network topologies for use with the device 100 will be known to those skilled in the art. As only one example, a host system may be provided, which can be an own-premises local area network (LAN), or wide area network in communication with LANs, with local computing resources such as one or more servers, data repositories and client devices such as terminals. The host system may comprise those components necessary to provide services to users over the LAN and also over a public or private network, such as the Internet, at their respective devices 100. The services can include but are not limited to messaging, directory services, collaborative applications, calendaring applications, search engines and file servers. The device 100 could access the host system using one or more of its communication subsystems 104a . . . n, for example through an access point, via the public or private network, and optionally via a public switched telephone network and a wireless network.

As mentioned above, the typically smaller form factor of mobile devices (as compared to larger devices such as desktop or laptop computers, although it will be understood by those skilled in the art that the examples and embodiments presented herein can be implemented on desktop or laptop computers as well as other non-mobile computing devices) results in reduced size of its integrated display and greater challenges in presenting an effective graphical UI and options for physical interaction (via a touchscreen, pointing device, etc.). At the same time, although the overall storage capacity of a mobile device may not rival the capacity of a contemporary laptop or desktop computer, the mobile device may have just as many—or more—application programs and different types of data as a laptop or desktop computer. Given the easy availability of thousands of mobile device applications from online "app stores" and other distributors for modest cost, users of mobile devices may collect a large number of applications for their tablets and smartphones. It is therefore desirable to provide an effective means for the user to access specific applications or data of interest easily, without expending too much of the user's time—and the device's processing resources or battery life—locating the desired application or data.

In view of the often-limited processing power and smaller screen size of the mobile device compared to desktop and laptop display panels, UI design on mobile devices has adopted some, but not necessarily all, elements of the desktop metaphor used for decades in personal computing. Applications available on a mobile device tend to be presented using icon representations arranged on a "homescreen" display containing arrays of icons representing the various applications. The homescreen can be considered to be a landing page, main display, or initial view of the mobile device's graphical UI much in the way the "desktop" is the initial view of the graphical UI of a personal computer executing an operating system presenting a windowed environment. The homescreen view (which, as discussed below, may comprise multiple stages) is typically generated and displayed by the operating system, and indeed, typically the initial view displayed by the mobile device on bootup or initialization is a homescreen view.

Figure 2:
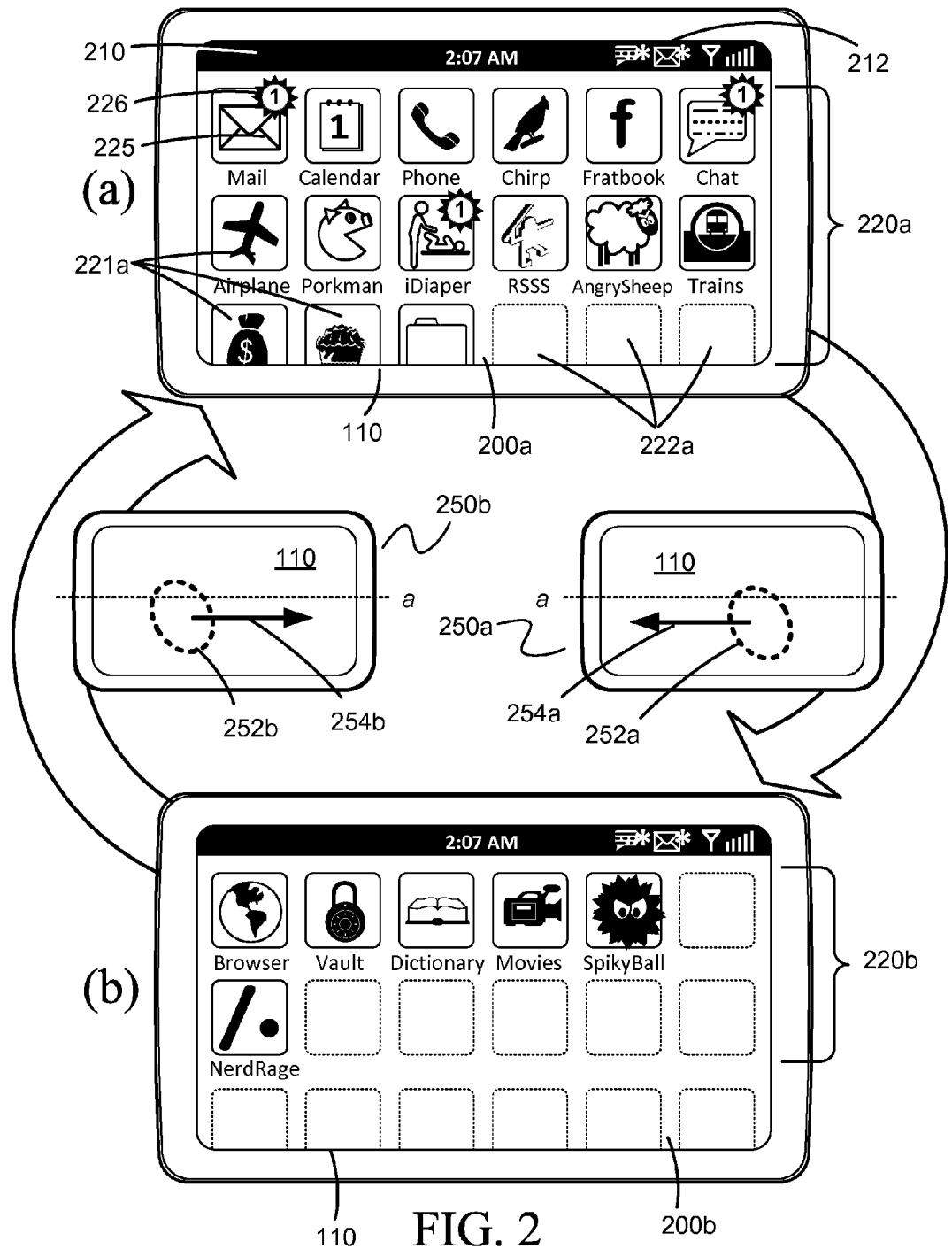
FIG. 2 is a schematic diagram illustrating two example homescreen views of a multiple-stage homescreen and example gesture navigation instructions for transitioning between the two views.

An example of a view that may be displayed as a homescreen in a mobile device 100 is shown in FIG. 2. Example (a) shows a first panel 200a (also referred to as a "view"), which is a fullscreen view of a homescreen (also referred to as a "home display") including a set of graphical UI elements 220a. As is conventional in the art, these graphical UI elements are icons, i.e., elements of a pictorial nature such as icons 221a, optionally displayed with accompanying text. Each of the graphical UI elements is associated with an entry point for a corresponding application. Actuation of a graphical UI element such as 221a (e.g., by "clicking" or "tapping" on the element, or otherwise invoking a user interface event associated with the element using a touch UI, pointing device, keyboard or other user input mechanism) results in launch of the application, if the application is not already executing, and presentation of the application UI to the user according to the entry point identified by the graphical UI element; if the application is already executing, which may be the case in a multitasking or quasi-multitasking operating system, then the application UI is presented to the user in its most recently updated state. Thus, for example, icon 225 may represent a messaging application such as email; actuation of that icon 225 will result in invocation of the corresponding messaging application, and display of its associated UI, which is typically a fullscreen display of one or more messages or a message listing.

In this description, the meaning of "application" will be understood by those skilled in the art as meaning a software program distinct from the device operating system, generally directed to the accomplishment of a specific task or tasks, and including one or more components for interaction with a user. Typically the application includes at least one user interface for receiving user input, providing output or feedback to the user, or both. Given the dependence on graphical UIs in current mobile and personal computing environments, an application typically includes a graphical application UI for presentation to the user via the display 110. In these examples, this UI may be referred to as the application "screen", "panel", "pane", "stage", or "view".

In this example, the first panel 200a, together with a status area or banner 210, fills the entirety of the available display area of a display 110. Regardless of the display area consumed by the status area 210, the first panel 200a is still considered to be a fullscreen view as it would be understood by those skilled in the art, as the panel 200a occupies the remainder of the available area of the physical display 110 with the exception of any operating system "chrome" (UI elements that are substantially consistently displayed during device operation, such as frames, menus, status, task or navigation bars, and the like). In other examples, a fullscreen display may occupy the entirety of the display area of the display 110 when no status bar or other UI features are displayed. The status area or banner 210 can be used to display status or environmental information such as the current time, strength of the current network connection(s) and type of connection(s), and indicators of receipt of new messages such as icon 212. A process executing in the background can update the information displayed in the banner 210. Not all of these features are necessarily displayed in the banner 210, and display of the banner 210 is not mandatory. In some implementations, the banner 210 is displayed consistently in the display 110 regardless of the current application or thread executing in the foreground (i.e., whether a homescreen is displayed or not); in other implementations, the banner 210 may not be displayed while an application (e.g., a messaging application, game, etc.) is executing, but the banner 210 is always displayed in a homescreen view.

The set of elements 220a are arranged in an array in the example of FIG. 2(a). In some examples, the elements 220a may be arranged in a predetermined order, such as alphabetically, in order of addition to the homescreen, or in order of frequency of use; the order may alternatively be user-defined. In some cases, icons are automatically arranged to fill sequential positions in an array (e.g., left to right, from top to bottom of the screen) as in the example of FIG. 2(a), but in some examples, the actual position or fill order of the icons may be customizable by the user, and need not be a regular arrangement such as a rectangular array. In the specific example of FIG. 2(a), three visible positions in the array of icons 220a are empty, as denoted by spaces 222a. Graphical UI elements and their associated files are typically provided when an application or the operating system is installed or provisioned on the mobile device 100, and when the application is deleted from the mobile device 100, the corresponding graphical UI element is removed from the homescreen. In some cases, the graphical UI element files may include animations or alternative versions. Also, in some examples, notifiable events (e.g., receipt of a new message by a messaging application) may be indicated by a change to the icon, such as the addition of a badge and/or count number to the displayed icon on the homescreen, as in the example icon 225 and its associated badge 226, which indicates that a new message has been received and is accessible by a messaging application represented by that icon.

Not shown in FIG. 2, the panel 200a may also include a "dock" or permanent collection of icons representing favorite, frequently-accessed, or user-specified applications. The dock typically remains visible as long as the mobile device 100 is in a homescreen or home display mode, i.e. displaying screens at the same level as, belonging to, or associated with, the home display of the device. Also not shown in FIG. 2, icons may be organized in distinct collections or folders. The general configuration, organization, and display of a typical homescreen will be known to those skilled in the art.

When there are too many icons to be displayed simultaneously within the currently displayable area of the homescreen, the user may need to scroll through the icons within the homescreen to view currently non-visible icons. Alternatively, or in combination with a scrolling feature, the homescreen may comprise multiple stages or panels. In a multiple-stage homescreen environment, the user can transition from a first panel to another to access additional icons, and can organize the icons on the multiple panels as desired. The transition from one view or panel to another may simply involve painting the next view to the display 110, or may include visual effects such as a slide effect (in which the current view is animated to appear to be sliding out of view at one side of the display 110, and the next view appears to slide in at the opposite side). A slide effect is commonly used in conjunction with "swipe" touch gestures on a touchscreen device, in which the swipe gesture mimics a "pulling" of an adjacent but currently non-visible panel into view on the display 110. FIG. 2(b) illustrates a second panel 200b of a multiple-stage homescreen. This panel 200b also comprises an array of graphical UI elements 220b; however, as can be seen in the figures, the number or arrangement of elements need not be the same as that in the first panel 200a of FIG. 2(a), and again, arrangement of elements in the second panel 200b will be known to those skilled in the art.

Navigation from a first panel to another panel in a multiple-stage homescreen can be accomplished using existing navigation techniques, such as a page next/previous button (e.g., a graphical user interface element displayed on screen that can be actuated to instruct the operating system to display a next panel of the multi-stage homescreen), designated keyboard keystrokes, or touch-based gestures such as a swipe gesture. FIG. 2 schematically illustrates the use of a touch-based gesture of a first type or class for changing the homescreen view from one panel to another while the mobile device 100 is a homescreen mode, i.e., a state in which homescreen views are displayed. As noted above, the embodiments and examples provided herein are described with reference to a touchscreen device, but these embodiments and examples can, with suitable modification known to those skilled in the art, be adapted for non-touchscreen devices.

As can be seen by the arrows and the schematic gesture illustrations 250a and 250b, a first swipe gesture across the display 110 (i.e., a touchscreen display) is interpreted by the device operating system and appropriate UI modules as an instruction to change views within the homescreen to a subsequent view selected according to the direction of the swipe gesture. The swipe gesture in this case can be considered to be a navigation command that is also directional, since the gesture itself includes a directional component. As can be seen in 250a, the associated swipe gesture involves a touch on the display 110 by a contact point (e.g., the user's thumb or finger) as indicated by 252a, and while contact is maintained on the display screen, the touch is swiped across the screen generally in the direction that the user wishes to indicate, as shown by this example as arrow 254a. In the example gesture 250a, the direction of motion of the swipe is substantially parallel to axis a, which designates a major axis of the display 110. The device operating system and/or touch UI module may be adapted to interpret swipes that are angled away from the axis a but still include a substantial component parallel to the axis a as a gesture 250a, thus compensating for user inaccuracy in performing the swipe gesture. In response to detection of this first directional command while the first panel 200a of the homescreen is displayed, the processor of the mobile device 100 displays the second panel 200b.

Similarly, a directional navigation command may be used to change the homescreen display back to the original panel 200a. In the example of FIG. 2, this gesture 250b is the same as the first gesture 250a, but is in the opposite direction, as indicated by the contact point 252b and direction of the swipe indicated by the arrow 254b. These gestures 250a, 250b can thus be analogized to a directional "next page" or "previous page" command. These two directional navigation commands 250a and 250b, being of a similar type (in this case, both are a swipe gesture in a direction generally parallel to the same axis a of the display 110), may be considered to both be input navigation commands of a first type or class. Repeated application of these particular navigation commands while the mobile device 1900 is in the homescreen mode can be interpreted by the processor as commands to page through or cycle through a plurality of panels or views within the multiple-stage homescreen in a sequence determined by the direction of the command.

Figure 3:
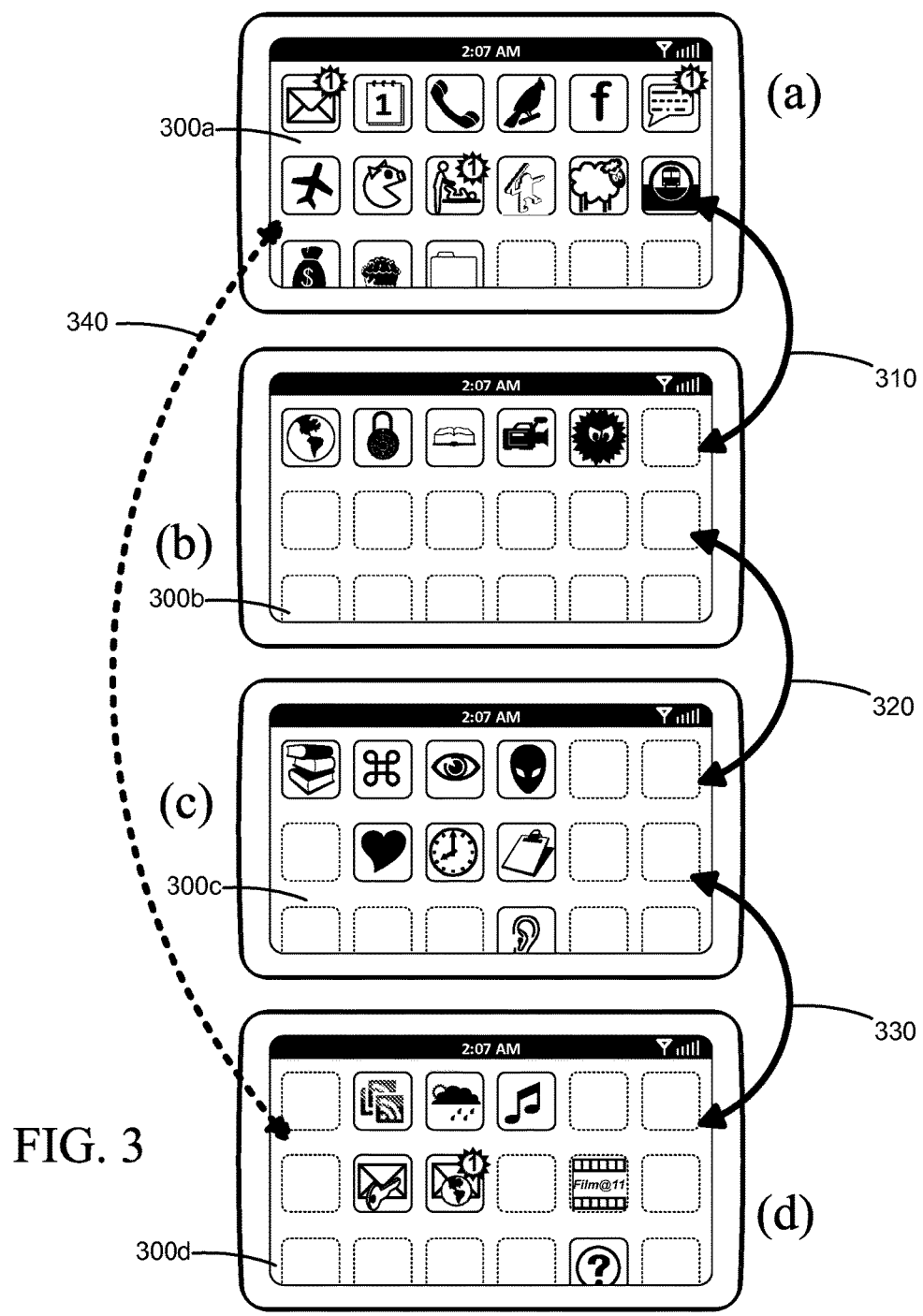
FIG. 3 is a schematic diagram illustrating four example homescreen views and navigation between the views.

The example of FIG. 2 illustrates a relatively simple multiple-stage homescreen comprising only two panels or panes comprising icons. In some examples, the homescreen may include three, four, or more panels. The maximum number of panels may be fixed by a setting in the operating system, or may be user-configurable. The same first class or type of navigation command may be used to navigate from one panel to another within the homescreen. Turning to FIG. 3(a) through (d), an example of a four-panel homescreen is shown. The first two panels 300a and 300b are similar to panels 200a and 200b of FIG. 2, while additional panels 300c and 300d are also provided, in this example again with various icons representative of different applications provisioned on the mobile device 100. Arrows 310, 320 and 330 illustrate a possible navigation flow from one panel to another; as can be seen in FIG. 3, these arrows are bidirectional; thus, in response to a navigation command of the first type, the homescreen display may be sequentially navigable from the first panel 300a to the second 300b, and thence to the third 300c, and back to the second 300b. In this example, there is a defined sequence to the multiple stages or panels of the homescreen from 300a to 300d, and back. In some examples, the sequence may in fact be cyclical, and in response to the same class of navigation command, the homescreen display may be sequentially navigable from panel 300d to panel 300a and back, as indicated by phantom arrow 340.

Other directional navigation commands of different types (for example, swipe gestures in a direction perpendicular to the gestures 250a, 250b described above) may be used to invoke different functions in the homescreen mode. For example, an upwards swipe on a touchscreen display 110 while in homescreen mode may invoke a multitasking pane or a notification bar.

Figure 4:
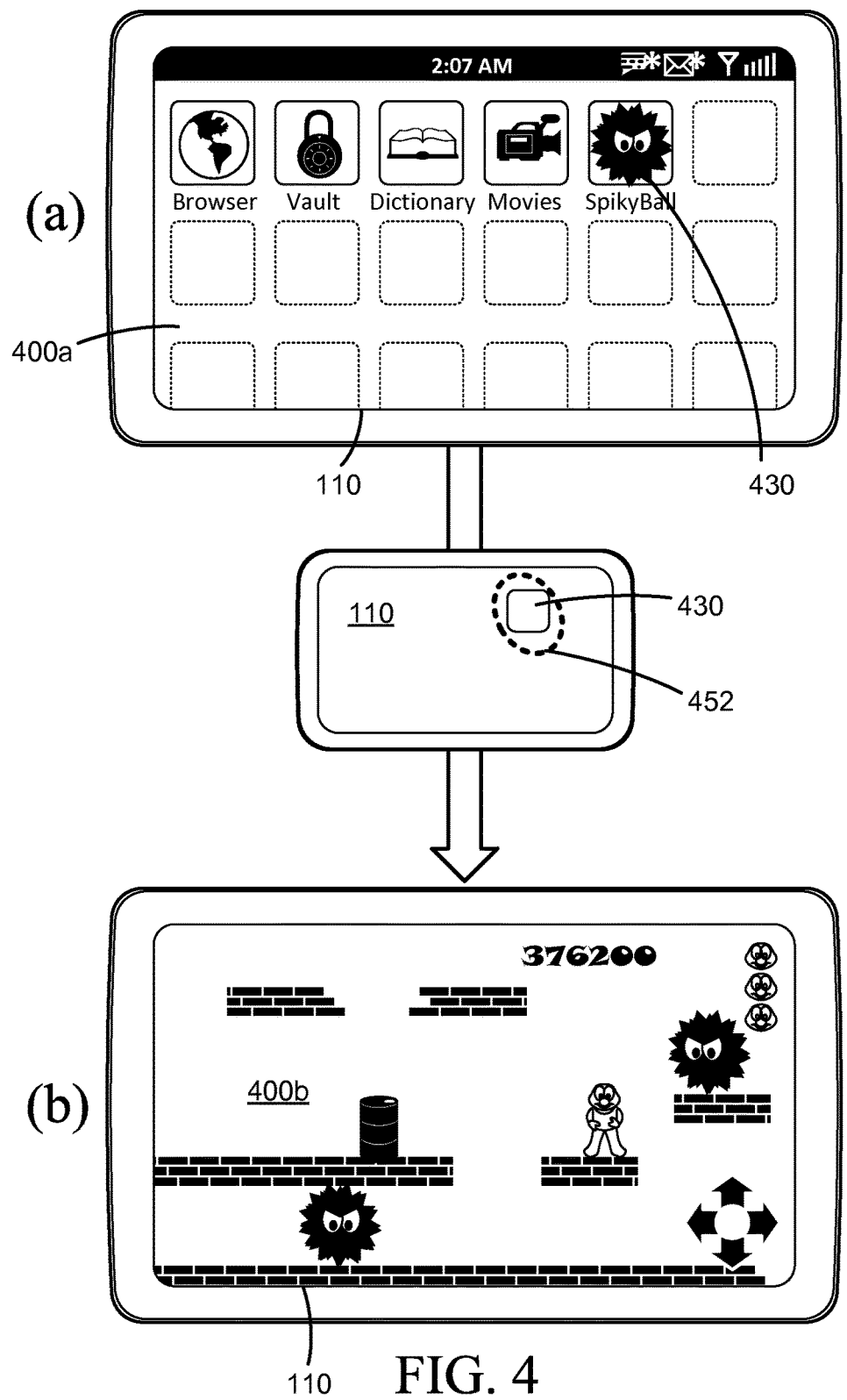
FIG. 4 is a schematic diagram illustrating a homescreen view and an application view and an example gesture navigation instruction for transitioning between the two views.

Different classes of navigation commands may be input to navigate among the homescreen views and application views. For example, in a touchscreen-based embodiment, a simple touch input may be used to actuate an icon displayed in a homescreen view, which in turn invokes a corresponding application on the device 100. Invocation of an application may include launching the application, or, if the application is already executing on the device in a background process or was previously executing and is now in a suspended state, increasing the priority of the application's processes or resuming execution of the application. This is illustrated in FIG. 4, in which an icon 430 displayed in a homescreen panel 400a is actuated, as indicated schematically by the contact point 452 overlaying the position of the icon 430 in touchscreen display 110. The result is a display of a view of the corresponding application 400b in place of the initial homescreen view 400a. In this example, the type of navigation command used to invoke the application—a touch event—is distinct from the type of navigation command—a swipe gesture—used to page between one homescreen view and another. This second type of navigation command illustrated in FIG. 4 thus causes the mobile device 100 to transition from the homescreen mode, in which a homescreen panel is displayed, to an application mode or execution mode in which an application is executed in the foreground.

If the mobile device 100 is adapted for multitasking, then more than one application may be launched without a previously launched application being terminated, and consequently more than one application view may be maintained in memory. How multitasking is accomplished varies according to the device operating system and the device's processing and memory capabilities. Techniques for implementing multitasking and sharing resources among applications in mobile computing environments will be known to those in the art; it is sufficient for the purpose of these examples to note that "multitasking" applications, in this context, includes "true" multitasking in which applications can execute unrestricted in the background; limited multitasking in which applications may register a thread with limited functionality and resources to run in the background; and simulated multitasking, where applications enter a suspended or inert state in which application data is maintained in memory, but execution of the application processes or threads is halted when the mobile device 100 returns to the homescreen mode or another application is invoked.

Figure 5:
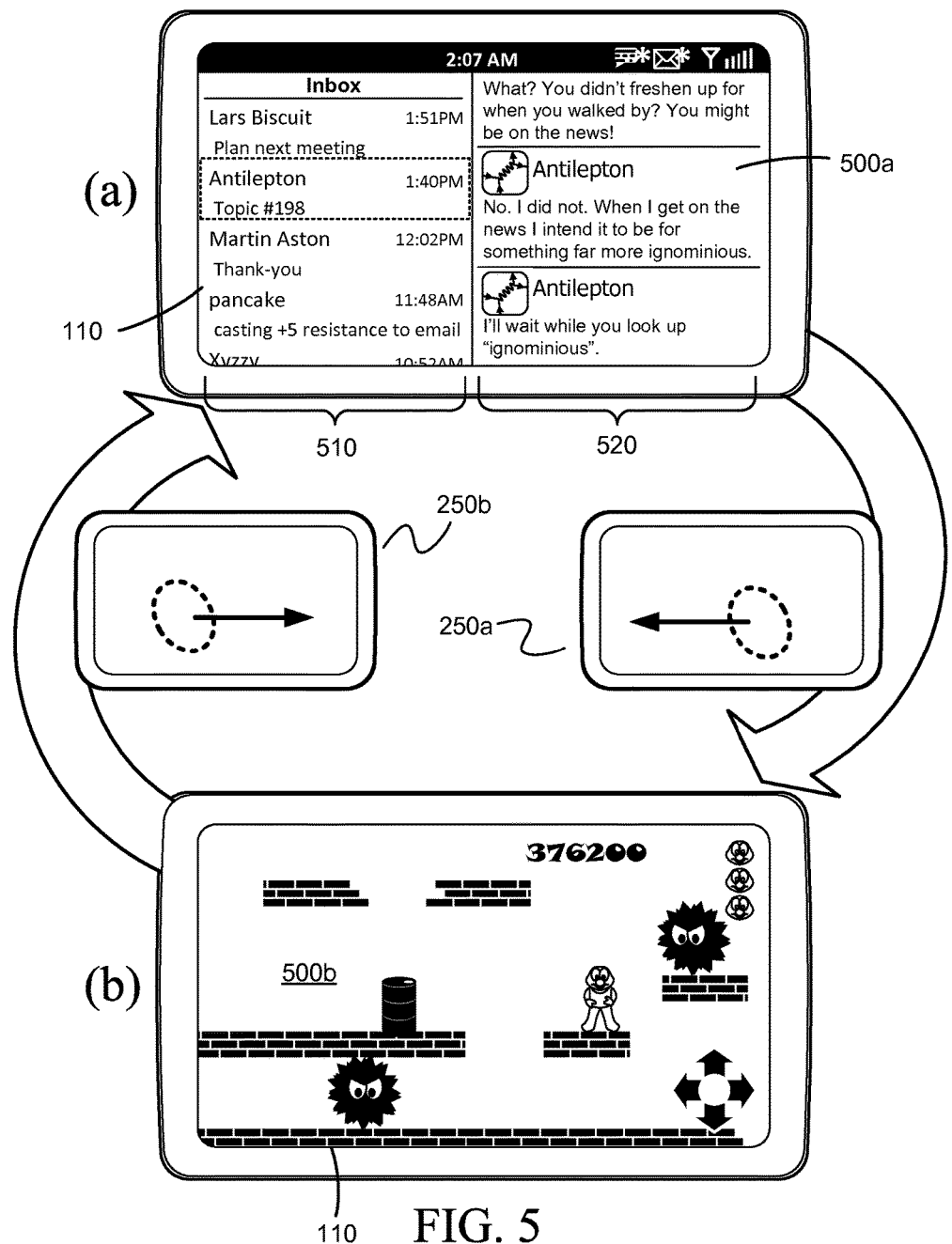
FIG. 5 is a schematic diagram illustrating two example application views and example gesture navigation instructions for transitioning between the two views.

When an application is executing in the foreground and one of its views is displayed to the user, the navigation commands applied in the homescreen mode may have different results when invoked in the application. For example, as shown in FIG. 5, the first class of navigation command (in this example, the class including swipe gestures 250a and 250b) can be used while in the application mode to transition between views associated with different applications. In FIG. 5(a), a first application view 500a, in this example a messaging application, can be transitioned to a second view 500b for a different application, in this case a game in FIG. 5(b).

When in the application mode, the mobile device 100 may be returned to the homescreen mode through actuation of yet another command, such as actuation of a "home" button or other input mechanism (not shown), which is typically a physical mechanism, or selection of a menu option. If the mobile device 100 is capable of multitasking, the device 100 may then save the current application state, view and associated data in memory for later retrieval.

Figure 6:
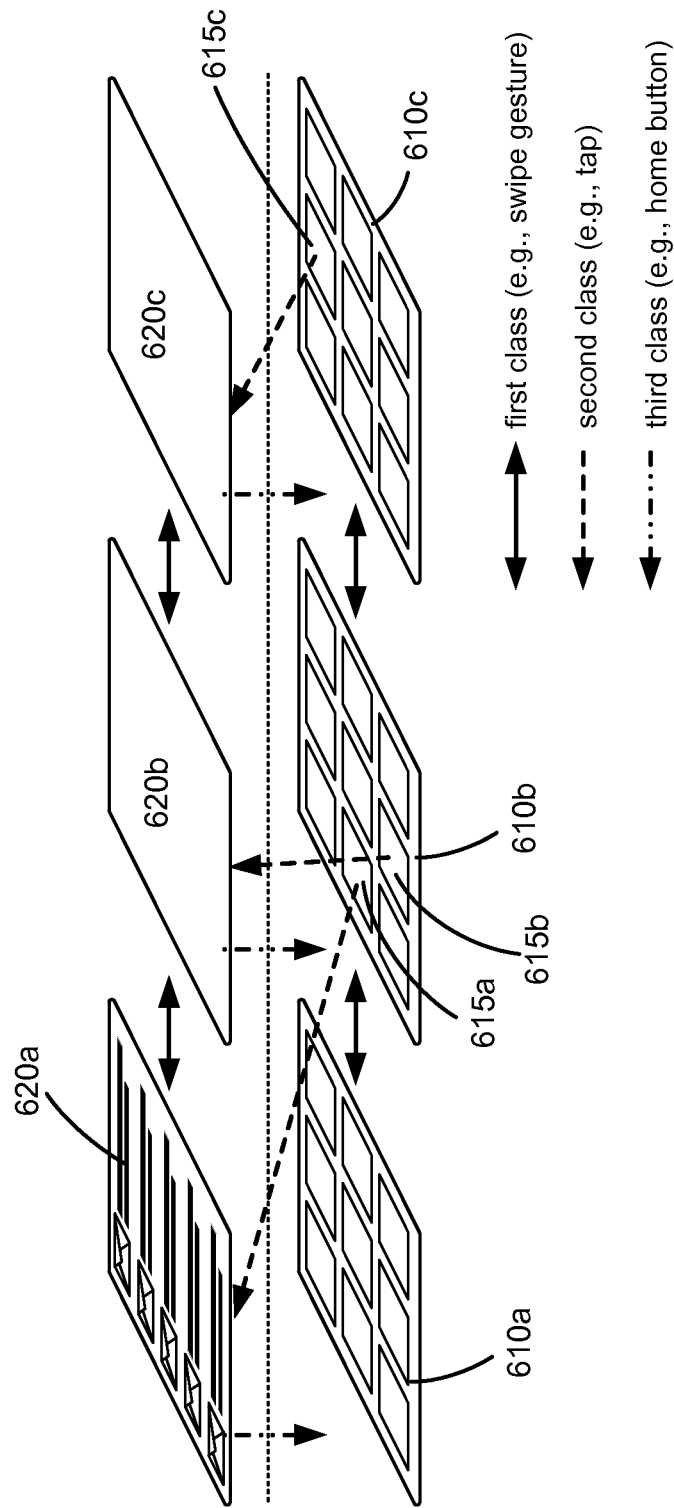
FIG. 6 is a schematic illustration of interaction of views of a multiple-stage homescreen and individual application screens displayable on the electronic device.

FIG. 6 illustrates the interrelationship between the homescreen mode and the application mode, and the associated types of navigation commands that may be used to navigate between them in this example. The mobile device 100 may be configured to display, while in the homescreen mode, a multiple-stage homescreen, comprising a number of panels such as panels 610a, 610b and 610c. Navigation from one panel to another may be accomplished as described above, through use of a directional command of a first type such as a swipe gesture, as indicated by the bidirectional solid arrows (refer to the legend in FIG. 6). The mobile device 100 may also be configured to display one or more application views 620a, 620b, 620c in an application or execution mode, and again, navigation from one application view to another may also be carried out in response to directional commands of the first type, again as indicated by the bidirectional solid arrows shown in FIG. 6. In this example, one such application view 620 may be a view for a messaging application.

However, the mobile device 100 might be configured such that navigation from the homescreen mode to the application mode using this first type of directional command is not possible. Instead, to invoke the application mode from the homescreen mode, a different type of command input is required, such as the aforementioned touch event on an icon of the homescreen. This is indicated by the first dashed arrows indicating the second class of navigation command between icon 615a and corresponding application view 620a; icon 615b and application view 620b; and icon 615c and application view 620c. Actuation of one of these icons invokes the corresponding application, thus causing the mobile device 100 to exit the homescreen mode and enter application mode. This second class of navigation is, effectively, one-way and not bidirectional like the first class of navigation command. To return from application mode to the homescreen mode—in other words, to dismiss the current application view and return to a display of a homescreen panel—a different type of navigation command is required, such as actuation of the home button or some other option, as indicated by the broken arrows corresponding to the third class of navigation command. Again, this type of navigation command is effectively one-way and not bidirectional.

In short, changing the current mode from homescreen mode to application mode, or changing the currently displayed view from a homescreen panel to a particular application view, or from a particular application view back to the homescreen panel, involves the use of disparate navigation commands, some of which may be functionally different (e.g., a touch event detected by a touchscreen versus actuation of physical button on the device, or a swipe gesture detected by a touchscreen versus a tap on an icon detected by the touchscreen), and some of which may be functionally similar but have specific constraints depending on the current device mode (e.g., a swipe gesture detected while in homescreen mode results in display of a homescreen panel, but the same swipe gesture detected in application mode does not display a homescreen panel).

Further, some applications or functions on a mobile device 100 may be more frequently used than others. For instance, messaging functions (email, IM, and SMS in particular) are generally popular and are frequently used by many users. Thus, a user may tend to repeatedly invoke a messaging application to check for current messages. On a mobile device provisioned with many applications (and thus many icons over a plurality of homescreen panels), locating the correct icon to invoke the desired messaging application may require paging through multiple views, and then invocation of the messaging application will result in increased consumption of processing resources.

Figure 7:
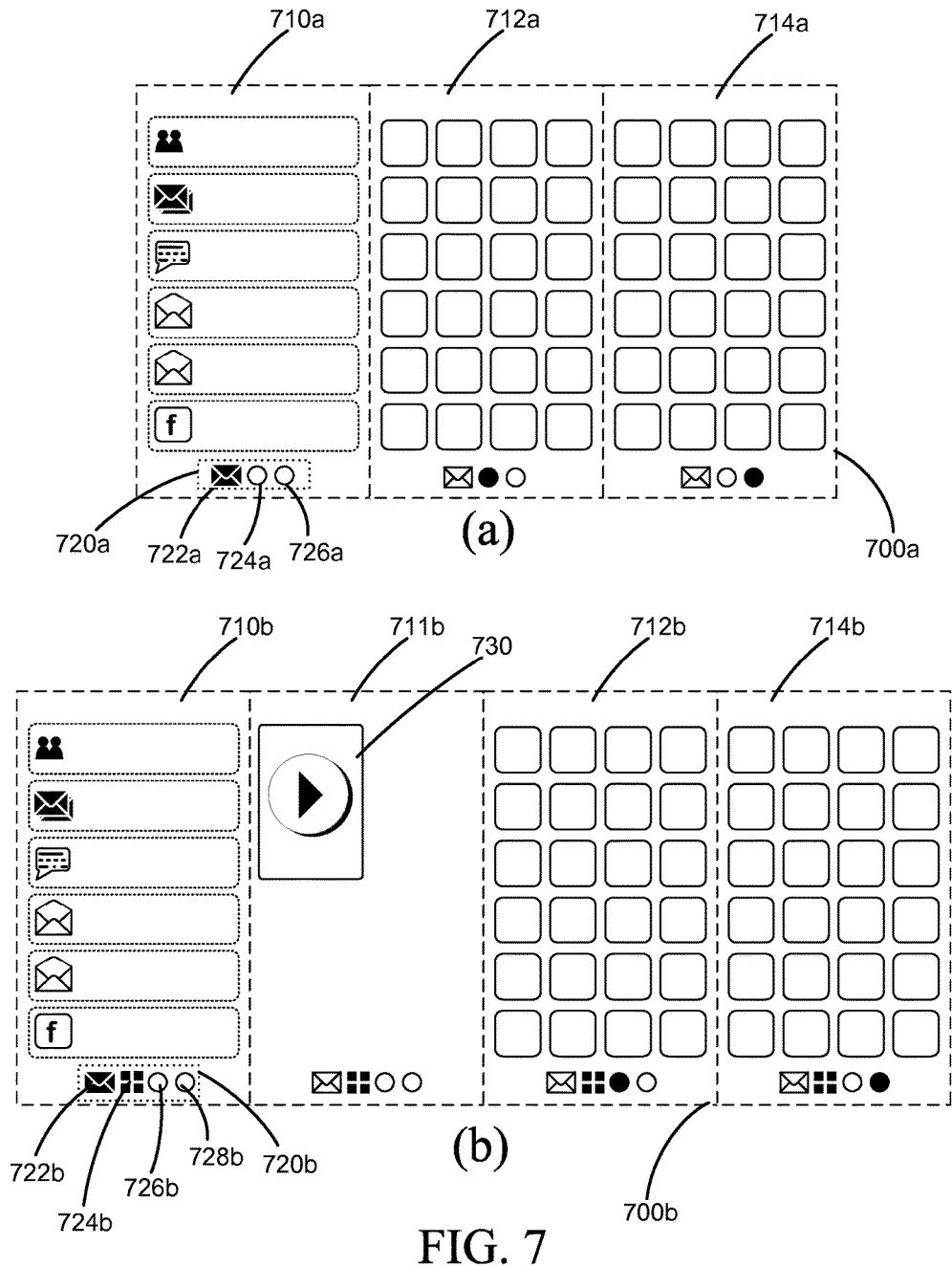
FIG. 7 is a schematic illustration of a layout of multiple-stage homescreens including an inbox or unified messaging pane.

Therefore, a multiple-stage homescreen may be adapted to include a view of an application or a view for a frequently-accessed function, thus effectively incorporating a fullscreen application view normally available in the application mode only into the homescreen mode. An illustration of this adaptation is shown in FIGS. 7(a) and (b). These illustrations depict two instances of a multiple-stage homescreen 700a, 700b, each of which contains a series of homescreen panels. In these figures, the panels are positioned immediately adjacent to each other in a continuous "filmstrip"-type schematic, which is representative of the perceived continuity of the homescreen 700a, 700b when the user navigates from one panel to the other. It will be appreciated by those skilled in the art that typically, only a single one of these panels (e.g., only 7100a, only 712a, only 714a, etc.) is displayed at a time by the mobile device 100. It may be observed that in the examples depicted in the accompanying drawings, the homescreen panels are arranged horizontally, in a row; however, in other examples that may be implemented with the various features described herein, homescreen panels may be arranged in a vertical (columnar) relationship. In such implementations, of course, the first type of navigation command may be a vertically-oriented swipe gesture rather than the horizontally-oriented gesture 250a, 250b described above.

While two panels in the example of 7(a) (namely, panels 712a and 714a) include typical launchpad-style arrangements of icons, a first one of these panels, 710a, comprises a message inbox view. This inbox view may be a unified or universal view, which includes messages for different accounts provisioned on the device, and/or for different message types or services, including email, IM, SMS, social messages, and the like. The operation of a unified messaging application or unified messaging function is discussed in further detail below.

Visual navigation guides may be included in the various homescreen panels to indicate to the user which part of the homescreen is currently being displayed. A set of visual elements 720a, for instance, may be provided on each panel as a navigation guide. The set 720a includes an icon or graphic for each panel in the homescreen; thus, in FIG. 7(a), visual elements 722a, 724a and 726a represent the three panels in the homescreen 700a. The visual element corresponding to the panel currently being displayed may be visually distinguished form the other visual elements. Thus, for example, in panel 710a, the first element—the envelope 722a—is shaded, while the remaining elements 724a and 726a are not. In panel 714a, which is the last panel in the order illustrated in FIG. 7(a), the last element 726a would be visually distinguished from the first two elements 722a, 724a. Further, in this example, the icon 722a in fact is shaped or otherwise presented to be indicative of the corresponding type of view included in the homescreen; in the example of FIG. 7(a), the icon 722a is therefore shaped like an envelope to represent the inbox view 710a.

In a further example, when at least one application is launched and executing in a multitasking mode (for example, in the background, at a reduced priority, or in a suspended mode but still present in memory), a further multitasking panel is inserted in the homescreen. This is illustrated in FIG. 7(b). Panels 712b, 714b may generally correspond to panels 712a, 714a of FIG. 7(a), but also included in the homescreen 700b is a further multitasking panel 711b. The multitasking panel 711b may display reduced-size views (i.e., less than fullscreen size views) of currently multitasking applications on the mobile device 100. Thus, in the example of FIG. 7(b), one application is indicated as executing on the mobile device 100, as there is only one reduced-size view 730 present in the panel 711b.

When the multitasking panel 711b is included in the homescreen 700b, the set of visual navigation guide elements 720b is therefore altered accordingly to reflect the insertion of the multitasking panel 711b in the set of homescreen panels. Thus, as can be seen in FIG. 7(b), the set 720b now includes the first element representing the inbox view 722b; a second icon or element representing the multitasking panel 724b; and further elements 726b, 728b representing the other launchpad-style panels 712b, 714b. When no applications are executing on the mobile device 100, the multitasking navigation element 724b can be removed from the homescreen displays. In these examples, the application or process providing the inbox view in panel 710a, 710b is excluded from the multitasking pane, since it is provided with its own navigation element 722a, 722b; indeed, if the inbox view is actually provided by an operating system process, then it may not be considered to be a distinct "application". In other examples, not shown here, the navigation element 724b representative of the multitasking panel 711b may be altered to reflect a current status of the currently executing multitasking applications on the mobile device 100; for example, the element 724b may indicate a count of the number of multitasking applications executing on the device 100. Of course, in this example and all others discussed herein, the number of launchpad-type panels may be varied; there may be only one, or more than two. Further, the order of the various inbox and multitasking panels within the homescreen need not follow the order illustrated here.

Since the message inbox view is included as a panel within the multiple-stage homescreen, it will be available in the homescreen mode, and thus the user may navigate to the message inbox view panel using the same type of navigation used to navigate between other panels of the homescreen. FIG. 8(a) to (d) illustrates navigation schematically, again using swipe gestures as a directional navigation command for paging from one homescreen panel to another. In this example, the panels are shown in portrait mode, but it will of course be appreciated that this may be implemented in landscape mode as well, as shown in FIGS. 2-5.

Figure 8:
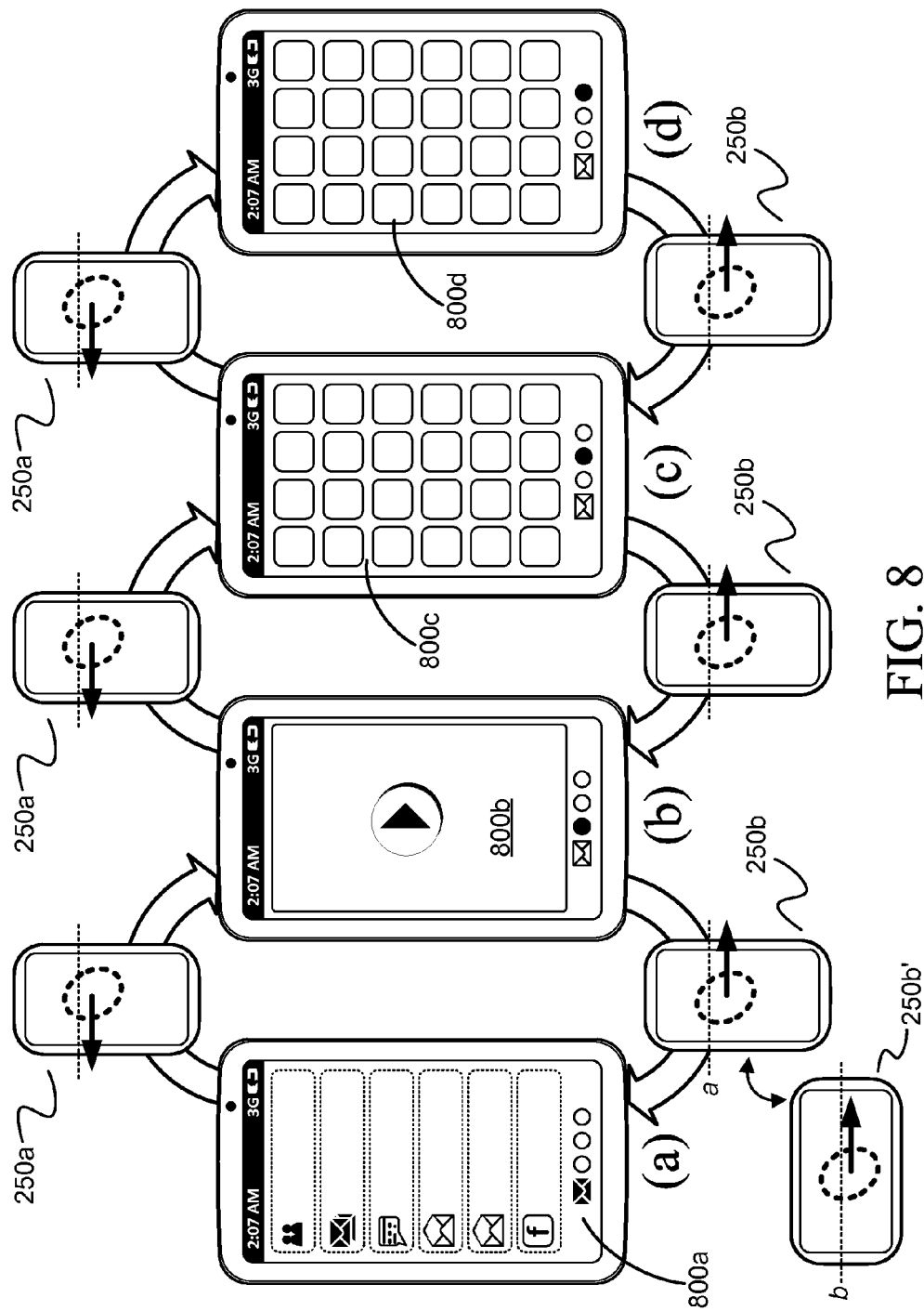
FIG. 8 is a schematic diagram illustrating four example homescreen views including a messaging panel and navigation between the views.
Figure 9:
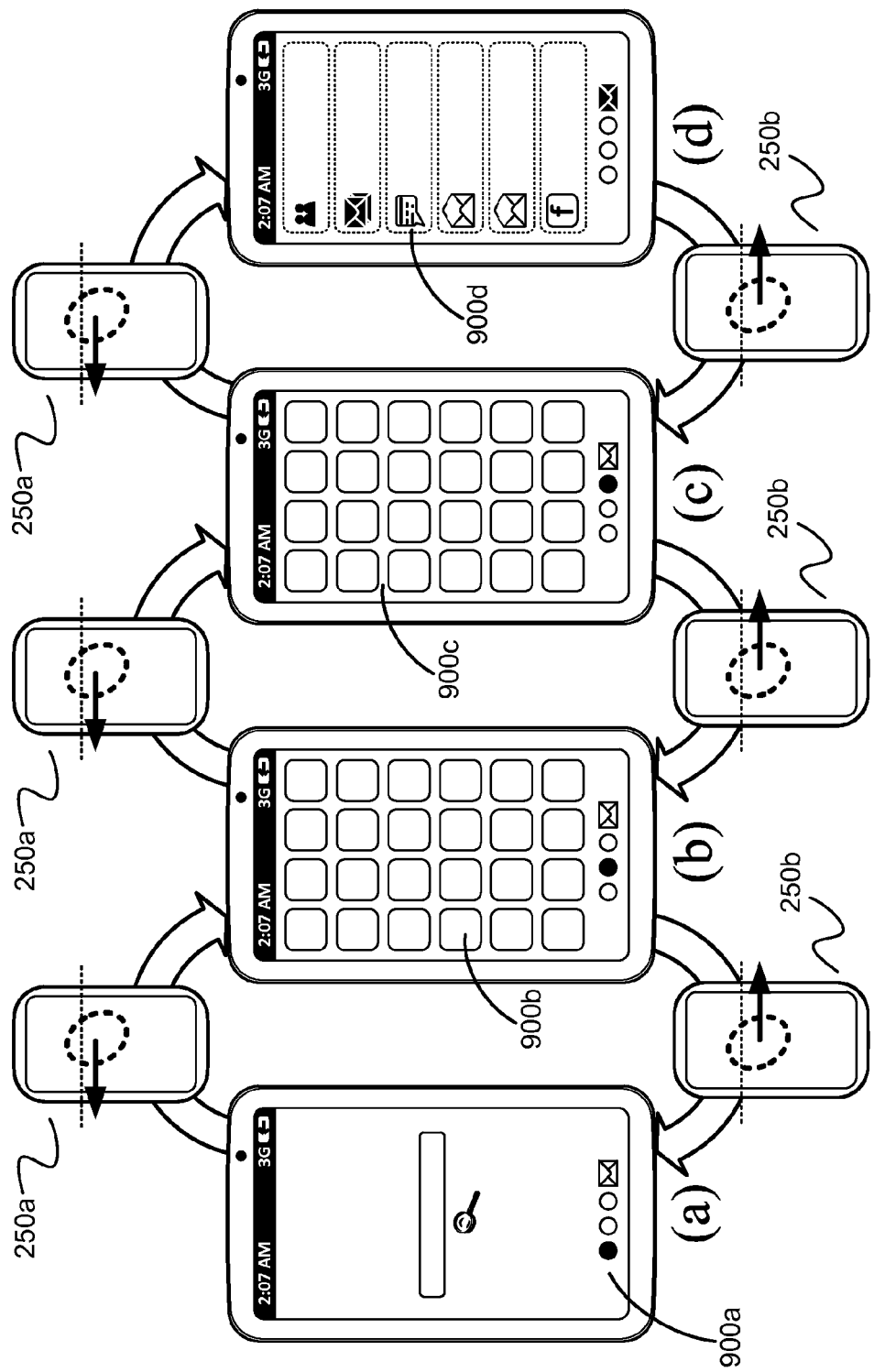
FIG. 9 is a further schematic diagram illustrating four example homescreen views including a messaging panel and navigation between the views.

Generally, as those skilled in the art will appreciate, mobile devices—especially those provided with touchscreen displays—can be provided with an orientation module for detecting the current orientation of the device (e.g., either "portrait" or "landscape", as those terms are understood by those skilled in the art), and in response to a change in orientation, the device may be configured to reformat, re-layout, or scale displayed content to better fit the dimensions of the display screen in the new orientation. Predefined alternative layouts may be stored at the device, or the device may be configured to alter displayed content on the fly in response to a detected orientation change. Thus, the user may be holding the device in portrait mode while navigating from one panel to another, but rotate the device while still in homescreen mode. In response, the operating system would redraw the currently displayed homescreen panel in the landscape-friendly layout. The user may continue to navigate between panels as before, for example with swipe gestures as described above with regard to FIG. 2. Although the device has been re-oriented with respect to the user, typically the direction of the directional navigation commands used to navigate from panel to panel in homescreen mode will remain the same with respect to the user. This is illustrated in FIG. 8 by example swipe gesture 250b', which includes a directional component substantially parallel to axis b of the device, which is perpendicular to axis a also illustrated in FIG. 8. Gestures 250b and 250b', and 250a and the corresponding gesture to 250a when the device is rotated to the other orientation (not illustrated in FIG. 8), are thus considered to be input navigation commands of the same type or class, since their directionality is the same with respect to the user. While sequences of panels illustrated in the accompanying drawings have the same orientation throughout the sequence, it will be understood that their orientation may change during the sequence and that the examples and embodiments herein include such variations.

Thus, in FIG. 8, navigation may be accomplished from the first message inbox panel 800a, to the second multitasking panel 800b, to the first launchpad panel 800c, to the second launchpad panel 800d, using only one type of gesture such as 250a, discussed above. Similarly, navigation back from 800d to 800a can be easily accomplished using another gesture such as 250b, also of the same type as gesture 250a, as discussed above.

Accordingly, there is no need to invoke a different class of gesture (such as a tap on an icon or actuation of a physical button) in order to view a message inbox, or to leave the homescreen mode at all. In those embodiments where the message inbox is also provisioned as a distinct messaging application on the mobile device, this adapted homescreen may thus provide an alternative method for accessing the messaging application UI; it may be invoked either by navigating the homescreen while in homescreen mode, or else it may be invoked by actuating the corresponding icon provided for the messaging application on one of the launchpad views.

In some instances, the message inbox panel may be provided by an operating system process, rather than by a distinct application process, thus avoiding the need to launch a full messaging application on the mobile device 100. Thus, the adapted homescreen alone provides access to this message inbox view. In either case—whether the message inbox panel is provided by a messaging application or as an operating system process—the message inbox panel may be launched on startup or initialization of the mobile device 100, just as the other homescreen panels are launched on startup. If the frequently-accessed function or other view that is supplied as part of the multiple-stage homescreen is not a message inbox, but is some other function supplied by a different application, that application may likewise be launched on startup of the device 100 so that its view is included as part of the homescreen.

FIG. 9(a) to (d) illustrate another example of an adapted multiple-stage homescreen. In this example, the homescreen includes a search panel 900a, as well as a message inbox panel 900d; the remaining launchpad-type panels 900b, 900c are sandwiched between them. This example may be combined with the example of FIG. 8 including a multitasking panel, although not illustrated here. Again, as with FIG. 8, the same first type of directional navigation command—gestures 250a and 250b—can be used to navigate between the various panels of the homescreen while in homescreen mode.

Figure 10:
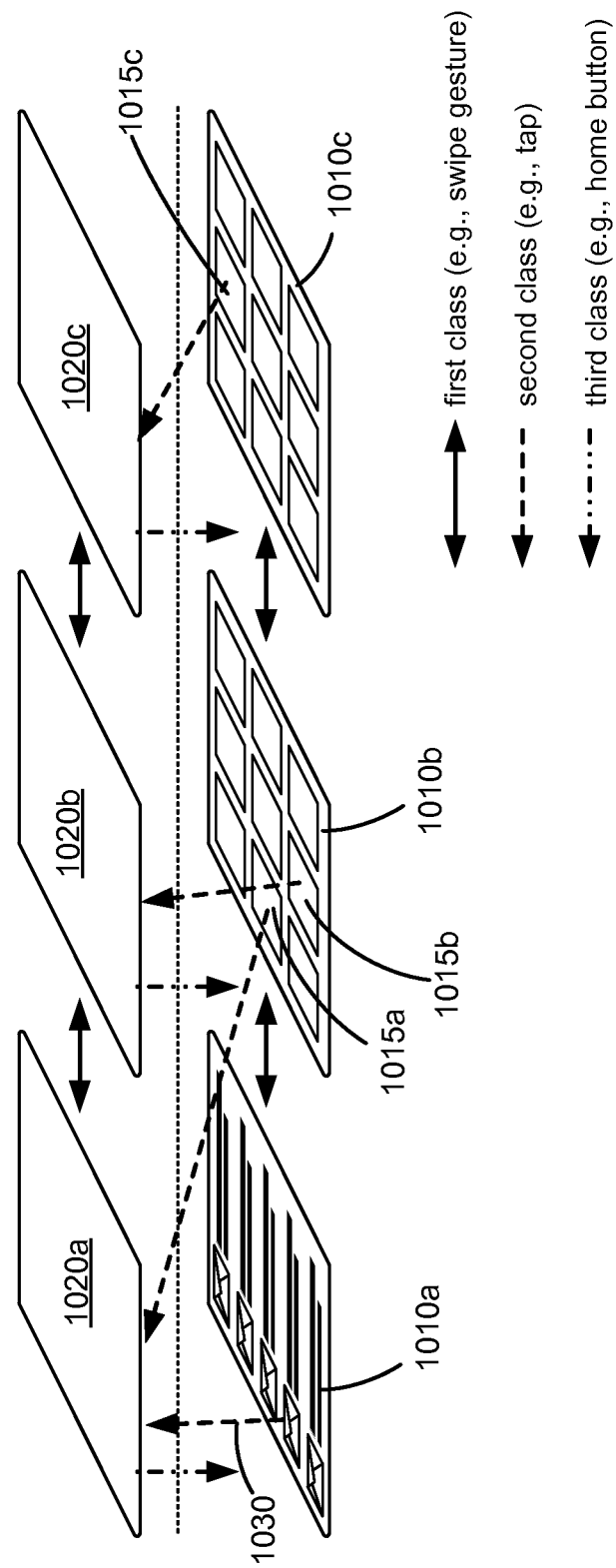
FIG. 10 is a schematic illustration of interaction of views of a multiple-stage homescreen including a messaging pane and individual application screens displayable on the electronic device.

The schematic of FIG. 10 illustrates the interrelationship between the homescreen, in which an adapted multiple-stage homescreen comprising panels 1010a, 1010b and 1010c is displayable, and the application, in which one or more of application screens 1020a, 1020b, 1020c may be displayed. In this example, homescreen panels 1010b and 1010c may be typical launchpad-type panels bearing a number of icons for applications provisioned on the mobile device 100. Again, while a panel of the homescreen is displayed, navigation from one homescreen panel 1010a, 1010b, 1010c to another may be carried out in response to input navigation commands of a first type or class, as discussed above, and as indicated by solid arrows in FIG. 10. Similarly, in the application mode, navigation from one view of a multitasking application to another may be carried out in response to input navigation commands of the same type or class. In this case, however, one of the panels of the homescreen, panel 1010a, is a message inbox view. Thus, it is not necessary to enter application mode to display the message inbox view. As before, entry into the application mode may be accomplished by input of a different class of navigation command, for example by actuating an icon 1015a, 1015b, 1015c, thus invoking an application; and return from the application mode to the homescreen mode may be accomplished by a further class of navigation command, such as actuation of a physical home button.

In some instances, as discussed below, the message inbox view may comprise a listing of messages for a variety of messaging accounts or services, and to view the content of a particular message, a graphical UI element representing that message in the listing may be selected and actuated to invoke an application associated with that specific message type or account. Thus, as indicated by arrow 1030, the message inbox panel 1010a may also provide a means for entry into the application mode, just like those launchpad-type homescreen panels 1010b, 1010c.

The message inbox view 1010a is so called since it functions as a form of message inbox, listing messages received at the device 100. However, as those skilled in the art will understand, "inbox" can include messages that are sent from the device as well as those received from the device, and can also include drafts and other messages that are not received at the device or stored in a received message folder or an inbox data store. Further, the message inbox view 1010a may be a unified inbox or unified message listing, comprising messages for more than one messaging format or service, and/or for more than one messaging account for a given message type. The mobile device 100 may be provisioned for a single or for multiple messaging accounts and be configured to employ one or more messaging formats. For example, the user may wish to send and receive messages using multiple accounts provided by a single service provider, access multiple services operating over the same or different networks to send and receive messages in different formats, or access multiple services providing messages in the same communication format.

Typically, messages associated with different accounts, services and/or formats are stored in distinct data stores, folders or files at the mobile device 100. For example, each message item received or generated at the mobile device 100 in association with a given service (such as email) can be stored as a separate message or data object in a data store associated with the service, retrievable for presentation to the user using a dedicated application executing at the mobile device 100 and associated with that particular message, service, or content format. These dedicated applications may be invoked using corresponding icons provided on the homescreen.

For convenience, however, message objects may be indexed for retrieval on the mobile device 100 through unified search or collection process implemented in the device operating system, or through another application or process for presentation of message listings or message content. An example of this is the aforementioned unified inbox or unified message listing, which presents to the user a global message list. A unified message listing or unified inbox view can provide entry points for access to individual messaging services or to individual messaging applications associated with each of the message types including in the unified inbox. The message or content elements displayed in the unified inbox display may include, in the case of messages such as email, header data such as sender, timestamp, and subject line. In addition, or alternatively, at least a portion of the message body content may also be displayed in the unified inbox. In the case of other message types, such as instant messages, the information displayed may include message body content in place of message header data.

Figure 11:
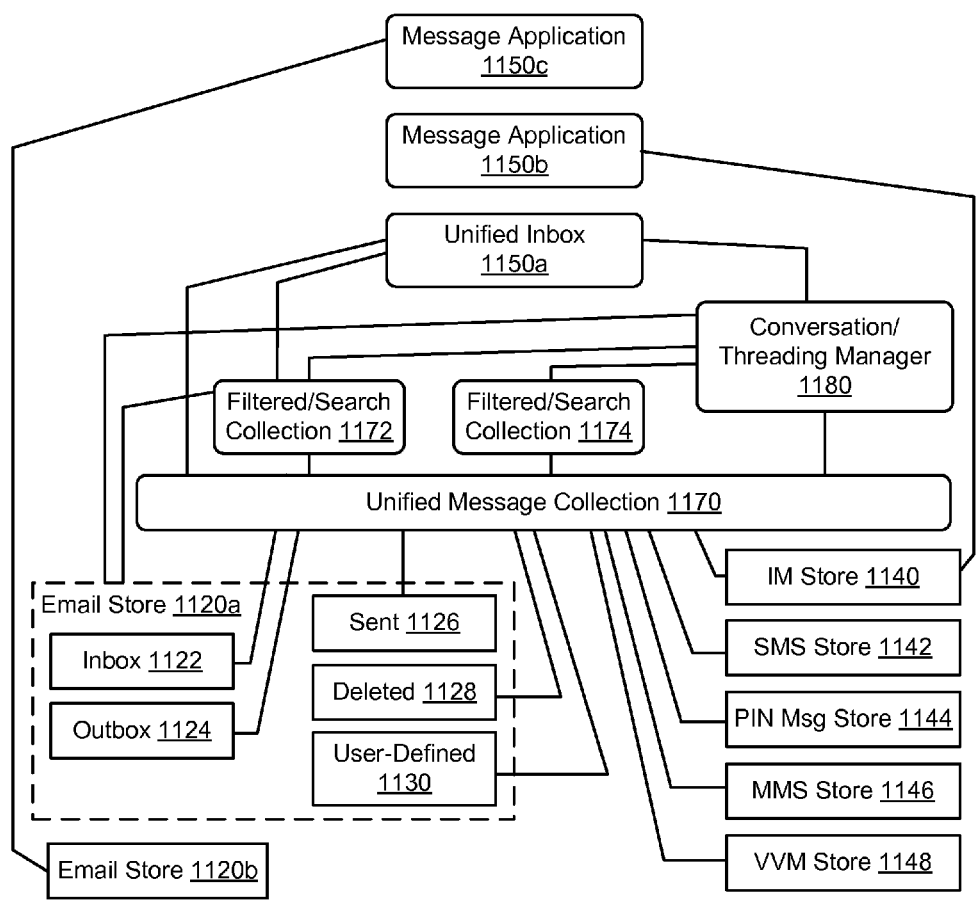
FIG. 11 is a schematic diagram of select message-related components of the electronic device of FIG. 1.

FIG. 11 provides a more detailed illustration of a possible arrangement of a unified message view or application on the mobile device 100, and its relationship with disparate message stores and other applications provided on the device 100. The device 100 may be provided with dedicated messaging client applications 1150c, 1150b, for example email applications, IM applications, SMS applications, and the like, as well as a unified inbox application or unified inbox process 1150a. One or more message data stores are also maintained on either the mobile device 100, or else remotely from the mobile device 100. Typically, with a mobile device 100, message data stores are maintained at the device itself, although the data stores at the device may represent only a portion of the complete message data store in association with a given messaging account. When the mobile device 100 is configured to support a number of message formats, message data may be stored in a number of distinct data stores, including email stores 1120a and 1120b, IM store 1140, SMS store 1142, PIN message (messages addressed using a personal identification number rather than an email address or telephone number) store 1144, MMS store 1146, and VVM store 1148. There may be more than one store of a given message type, which may be associated with different user accounts or different service providers. Thus, there can be more than one message application for a given message format. The various message applications can obtain data from their respective data stores.

A given message store, such as the email store 1120a, may include a number of folders such as an inbox folder 1122, which may be a default folder specified for all incoming messages received at the electronic device 100 (although, as explained above, the term "inbox" in relation to an application such as a unified inbox application or other messaging app need not be so restrictive), or at an online service or the host system on behalf of a user account the electronic device 100; a sent folder 1126, an outbox folder 1124 for those messages in the process of being transmitted; a deleted folder 1128; and other user-defined folders 1130. Implementation of message "folders"—whether by means of an explicitly—set flag value, inclusion of a message in a particular file or physical location, and the like, will be understood by those skilled in the art, and all such examples are contemplated herein. The various message stores comprise a set of data sources that may be directly accessed by their corresponding dedicated messaging applications, as shown in FIG. 11; however, the unified inbox application or process may also register a listener for each data store of interest, and receive notifications from each store upon a change (such as storage of a new message in the message store or an update to the status of an existing message). For convenience, a unified message collection object 1170 can be defined to create an aggregate master index of references for any messages stored in one of the message stores. An example of such an object is identified in U.S. Pat. No. 7,568,011, issued Jul. 28, 2009, the entirety of which is incorporated herein by reference. The unified collection is then provided to the unified inbox process or application 1150a, and this latter process or application then identifies from the collection those messages to be displayed in the unified inbox view, and retrieves relevant message data (e.g., header data such as subject line, sender/recipient, timestamp) for those messages directly from the corresponding message store. The unified inbox application or process 1150a then generates a message listing display using techniques known in the art.

One or more filter or search collection objects 1172, 1174 defined with reference to one or more filter criteria (such as specific message attributes, header values, and keywords) to define a filtered collection of messages based on the unified message collection object 1170 may also be provided. Further, messages presented in a message listing such as the unified inbox view may be presented in a "grouped", "conversation" or "threaded" mode, in which messages identified as belonging to a common thread are grouped together and presented in a single entry in message listing. Accessing one of these single entries then invokes a further individual message list view in which the messages identified as belonging to that thread are displayed. The categorization or grouping of messages may be carried out using a variety of different rules and heuristics, many of which are known in the art. An example of determining thread membership is described in U.S. patent application Ser. No. 13/025,822 filed on Feb. 11, 2011, the entirety of which is incorporated herein by reference.

Figure 12:
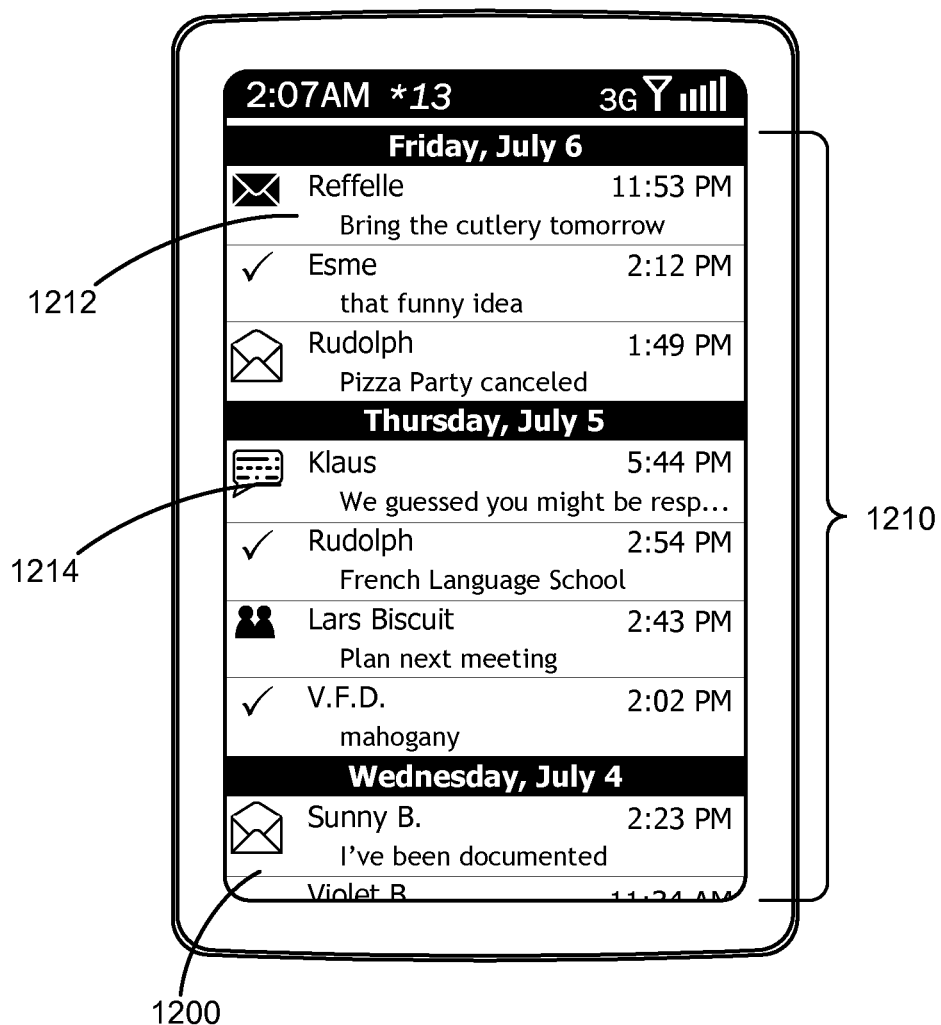
FIG. 12 is an example inbox view forming part of a multiple-stage homescreen.

The unified inbox view presented as part of the multiple-stage homescreen may take any one of a number of formats. A first example is the unified inbox view 1200 of FIG. 12, comprising mainly of a message listing 1210 for a variety of different messages types and accounts. This view presents a simple, reverse-chronological list of message entries, each entry corresponding to a particular message. Thus, for instance, message entry 1212 represents an email message received using a first email account provisioned on the mobile device 100, and message entry 1214 represents an instant message received at or sent from the mobile device 100. In this example, the unified inbox view also provides a series of application entry points for the dedicated messaging applications corresponding to each message. Thus, when the user wishes to read one of the messages listed in the view 1200, the corresponding message entry can be actuated (e.g., tapped, clicked, etc.) to invoke the corresponding dedicated application, which will then retrieve and display the message content of that message. Thus, the unified inbox view provides an alternative to locating an icon associated with the dedicated messaging application elsewhere on the homescreen simply to launch the messaging application.

Figure 13A:
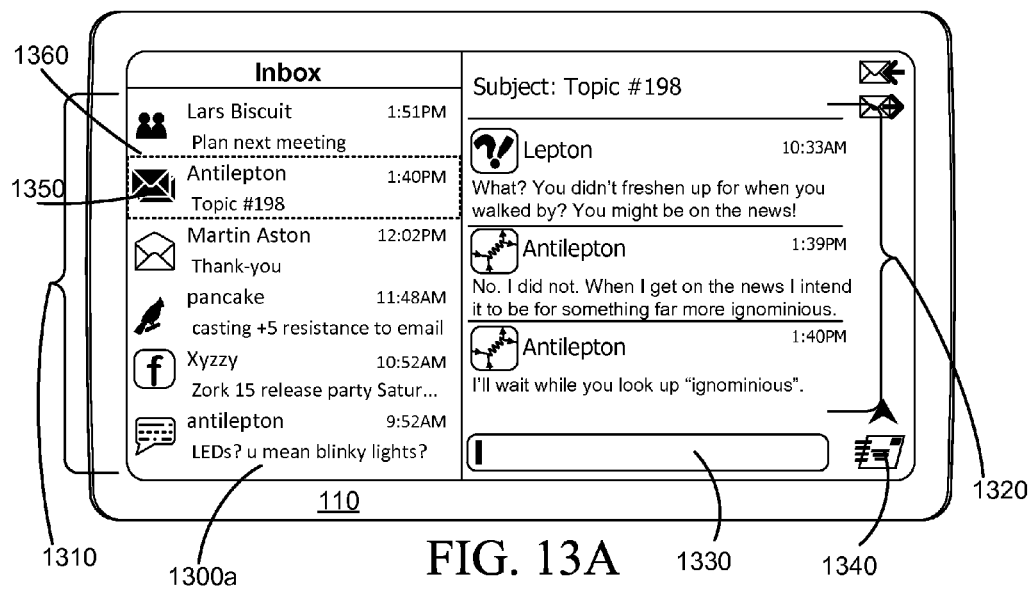
FIGS. 13A to 13C are example inbox views forming part of a multiple-stage homescreen.

As another example, the unified inbox view included in the multiple-stage homescreen may provide a preview of message content, so that invocation of the corresponding dedicated messaging application is not necessary. Turning to FIG. 13A, a first messaging view 1300a is shown. This view includes a message listing 1310 as well as a viewing region 1320, for displaying content from a message or message thread selected from the message listing 1310. In the example of FIG. 13A, message thread 1350 has been selected, as indicated by highlight region 1360; thus, the content displayed in the viewing region 1320 is taken from one or more messages from the message thread 1350. In some examples, this viewing region 1320 is merely a preview region, in that the display of message content taken from a new message in the region 1320 does not result in that new message being marked opened or read. For the message to be marked open or read, it must still be retrieved and displayed by the dedicated messaging application associated with that message account or type. (Terms such as "new", "opened" and "read" take their commonly understood meanings, as known to those skilled in the art; thus, a message that is opened or read is no longer new, but the fact that a message is marked opened or read does not mean that the user has necessarily perused the message's contents.)

Figure 13B:
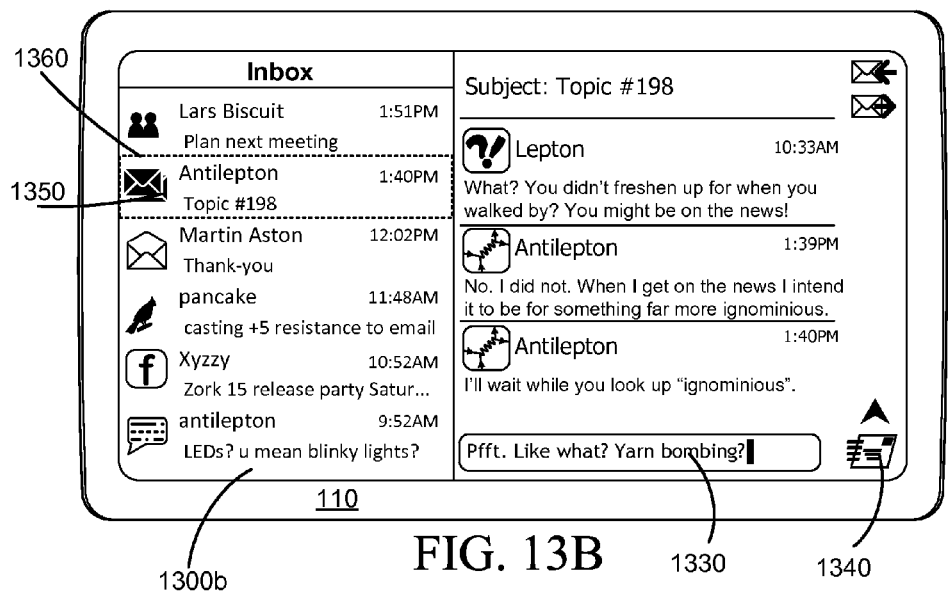
Figure 13C:
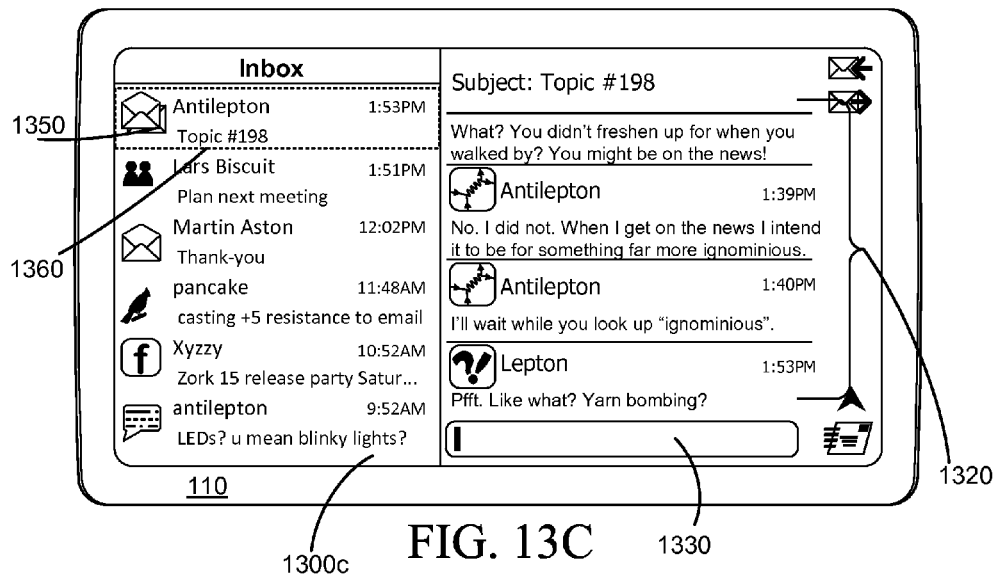

As a further example, the unified inbox view may be configured to also receive data for preparing and transmitting reply messages or new messages. This option is also shown in FIG. 13A, in which the viewing region 1320 also includes a reply input field 1330 and an accompanying send button or UI element 1340. Content input in the reply input field 1330 is then used to construct a reply message to the selected message in the message listing 1310 whose content is displayed in the viewing region 1320, or alternatively, when the entry selected in the message listing 1310 is a message thread, to a selected message of the selected message thread (such as the most recently received message). Examples of the changes resulting in the messaging view 1300a are shown in FIGS. 13B and 13C. Thus, in FIG. 13B, content has been entered in the reply input field 1330 of messaging view 1300b. Once the send button 1340 is actuated, thus invoking a command to construct and send a reply message to the last message received in the displayed thread, the entered content is inserted in a message body, and the message addressed to the sender of the last message as appropriate, and the message transmitted from the device 100. The actual construction and transmission of the message may be carried out by the dedicated messaging application associated with the user's account that had received the message being replied to, or associated with the selected message type. Thus, in this example of a messaging view which forms part of the homescreen, the mobile device 100, while in the homescreen mode, passes data to a messaging application executing in the background, and the messaging application, executing in the background, prepares and transmits the message.

The result of transmission of the message is reflected in the further message view 1300c of FIG. 13C. Here, the reply input field 1330 has been cleared, and the viewing region 1320 now includes the content previously entered in the field 1330 in FIG. 13B. Further, the message listing has been updated such that message thread 1350 has been promoted to the highest position (since its timestamp is now the most recent). The updates to the message listing may be obtained dynamically by the unified inbox application or process 1150*a* as new message data arrives in the unified message collection 1170 as a result of the transmission of the message and its storage in one of the various message stores on the mobile device 100.

A fuller description of the configuration and operation of a message inbox view comprising a reply input field is provided in U.S. patent application Ser. No. 13/536,508 filed 28 Jun. 2012, the entirety of which is incorporated herein by reference. In other examples, the homescreen does not include a unified inbox view, but rather comprises a dedicated message view (e.g., a view of only email message listings). In still other examples which may also be implemented in conjunction with a dedicated message view and not only the unified message view, rather than a single reply input field 1330, the unified inbox view or other messaging view included in the multiple-stage homescreen includes a full message composition interface, such that the user may input not only message content, but also addressees, subject line, and other appropriate message data, and send the message while still in the homescreen mode. In this case, the message data may still be passed to a dedicated one of the messaging applications executing on the device to prepare and send them message.

Figure 14:
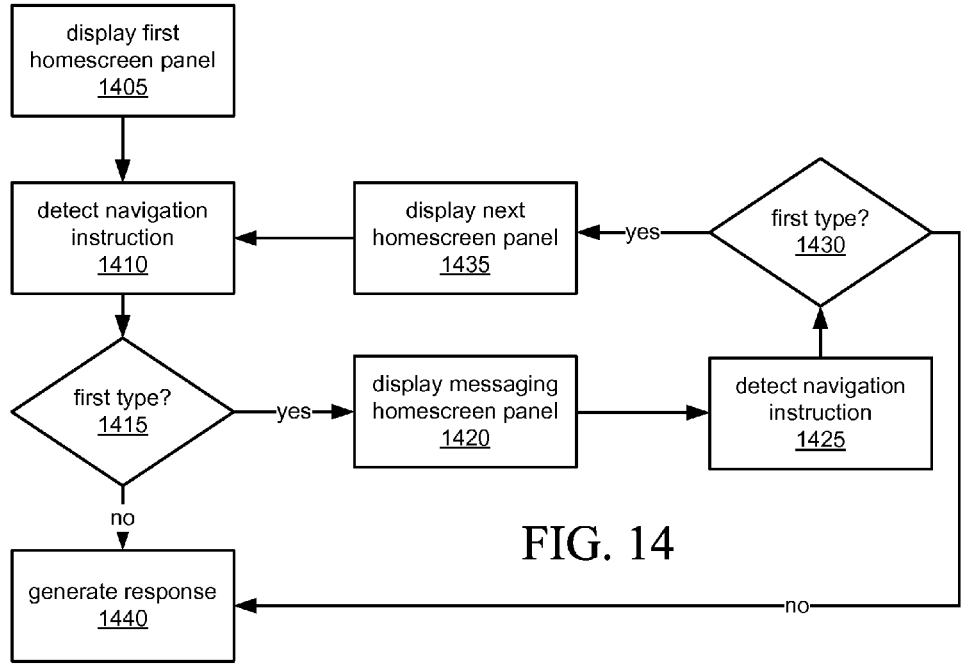
FIG. 14 is a flowchart illustrating an example method of navigating a multiple-stage homescreen.

FIG. 14 provides an overview of a method for presenting the unified inbox or other messaging panel in the multiple-stage homescreen. At 1405, a first panel of the homescreen is displayed. At 1410, an input navigation instruction is detected. This navigation instruction may be of the first type discussed above (e.g., a directional navigation command to display an adjacent one of the homescreen panels), or it may be of another type (e.g. actuation of an icon or other UI element to invoke an application or some other process on the device 100). At 1415, it is determined what type of navigation instruction has been input. If it is of the first type—i.e., a command to display another one of the homescreen panels—then at 1420, a next one of the homescreen panels is displayed. In this example, it is presumed that this next panel is the messaging panel of the homescreen. If, on the other hand, the navigation instruction is not of the first type, an appropriate response to the input instruction is generated instead at 1440.

While the messaging panel is displayed, a further navigation instruction may be detected at 1425. Again, a determination is made whether the received instruction is of the same type, in which case a next one of the homescreen panels (which may be the first homescreen panel of step 1405) is displayed. The mobile device 100 then awaits a further navigation instruction at 1410. If, on the other hand, the further navigation instruction detected at 1425 is not of the first type, but is a different type of command (e.g., a command to invoke a dedicated messaging application, or a command to send a message input at the messaging panel), then that appropriate response is generated by the mobile device 100 at 1440.

In still a further embodiment, the unified inbox or other messaging panel of the homescreen is protected with a screen or display lock and/or password. When a navigation command is received while in the homescreen mode to change the homescreen display to the unified inbox panel, rather than immediately displaying the unified inbox panel, an intermediate panel is displayed. The intermediate panel may require input of an unlocking input, such as a previously-defined gesture input, a password, a personal identification number, or other type of credential, for the unified inbox panel to be displayed. In this manner, the intermediate panel provides a level of security for the inbox panel without imposing the same level of security on the remainder of the homescreen panels. For example, if the user provides the mobile device for a guest user to use, the guest user can still be free to access other functions of the mobile device (e.g. other applications, voice communication, camera functions, etc.) via the homescreen, but will not be able to access the inbox panel of the homescreen, where potentially sensitive data is displayed.

Alternatively, the intermediate panel may not require credentials, but might instead require an unlocking input comprising some non-secure confirmatory action (e.g. unlocking a slide lock or a confirmatory tap or double-tap) before displaying the inbox panel. In that case, the intermediate panel will effectively function as a privacy guard or "speed bump", reducing the likelihood of inadvertent display or manipulation of message data in the event the user unintentionally navigates through the homescreen panels to the unified inbox panel. For example, in the event the user is over-enthusiastic in "swiping" his or her way through the homescreen panels using swipe gestures, he or she may navigate to the inbox panel without realizing it, then continue swiping and thus inadvertently select a message and perform a gesture command on it, such as viewing, deleting, replying, etc. The intermediate panel, however, "interrupts" navigation through the homescreen (as it does in the more secure credential-based implementation mentioned above), thus preventing inadvertent navigation through the inbox panel. In the case where the device is provided to a guest user, even if the inbox panel is not secured as above, the interruption provided by the intermediate panel may serve as a reminder to the guest user to observe proper etiquette and to avoid viewing the user's inbox messages. As will be seen in the examples below, the intermediate panel may be a distinct panel from the inbox panel, or it may be incorporated into the inbox display.

Figure 15:
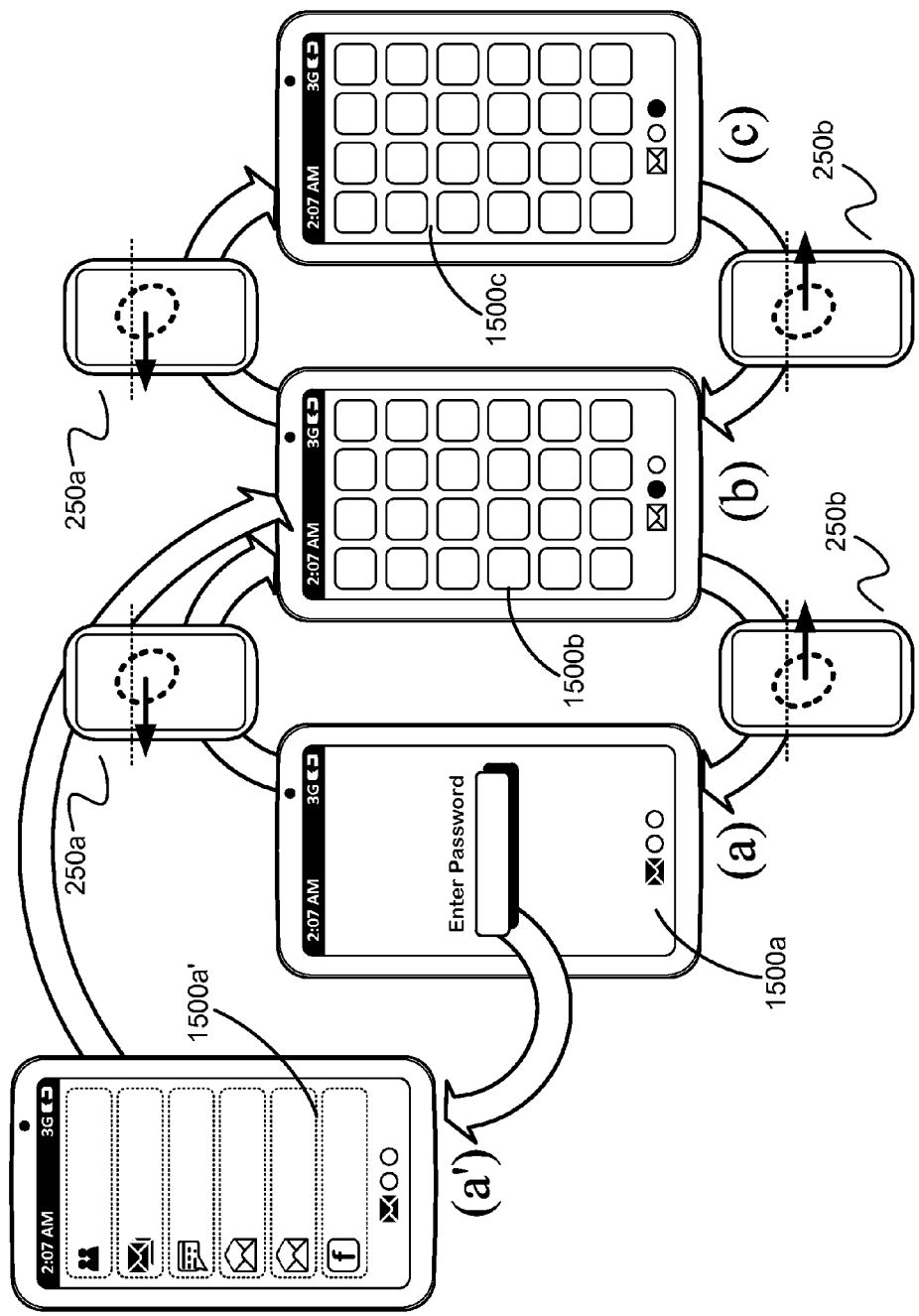
FIG. 15 is a schematic diagram illustrating four example homescreen views including a messaging pane and a lock screen, and navigation between the views.

A first example is shown in FIG. 15, which illustrates navigation between consecutive panels of a multiple-stage homescreen. Navigation from the launchpad-type panel 1500*c* of the homescreen to another launchpad-type panel 1500*b* may be accomplished using a typical navigation command, such as the swipe gesture 250*a* or 250*b*. However, when navigating from one of the homescreen panels to the unified inbox panel, a lock or password panel 1500*a* is displayed rather than the unified inbox. In the example of FIG. 15, this panel 1500*a* is a password panel. To switch to the unified inbox panel, the user must correctly input the requisite password, personal identification number, or other credential. Upon successful entry of the password, the actual inbox panel 1500*a'* is displayed. In other examples implemented on a touchscreen device, the credential may be a gesture input or sequence of touch inputs rather than a typed password or other sequence of alphanumeric characters.

When the user is finished with the unified inbox panel 1500*a'*, the same class of navigation command (e.g., a swipe gesture 250*a*) may be used to switch back to another panel of the multiple-stage homescreen. However, in this case, the navigation flow may bypass the lock or password panel 1500*a*, and return directly to the previous homescreen panel 1500*b*. In other embodiments, though, the navigation flow may still include the lock or password panel 1500*a*. A password-based implementation such as that of FIG. 15 thus provides a level of security as well as privacy; although various applications can still be accessed via the unlocked portions of the homescreen (such as panels 1500*b* and 150000*c*), message content cannot be accessed without the password. In some implementations, the unified inbox panel 1500*a'* may be the only entry point provided on the mobile device 100 to access any messaging functions at all, so message data cannot be accessed using other homescreen panels or icons, with the exception in some examples of a notification window or panel displaying recent events (e.g. device alerts and/or recent new messages). In other embodiments, a unified inbox icon may be provided on another homescreen panel, but actuation of that icon simply displays the unified inbox panel, if unlocked (as in the examples of FIGS. 8 and 9) or the lock panel 1500*a* (as in the example of FIG. 15). In other implementations, though, dedicated messaging applications may still be available to be accessed on the mobile device 100; optionally, these individual messaging applications may be secured with their own passwords (e.g., the user credentials associated with the messaging accounts for which those applications are provided). This security or privacy feature of the unified inbox panel 1500*a*' may optionally be set (including setting the password or code) or disabled through user- or administrator-alterable settings.

Figure 16:
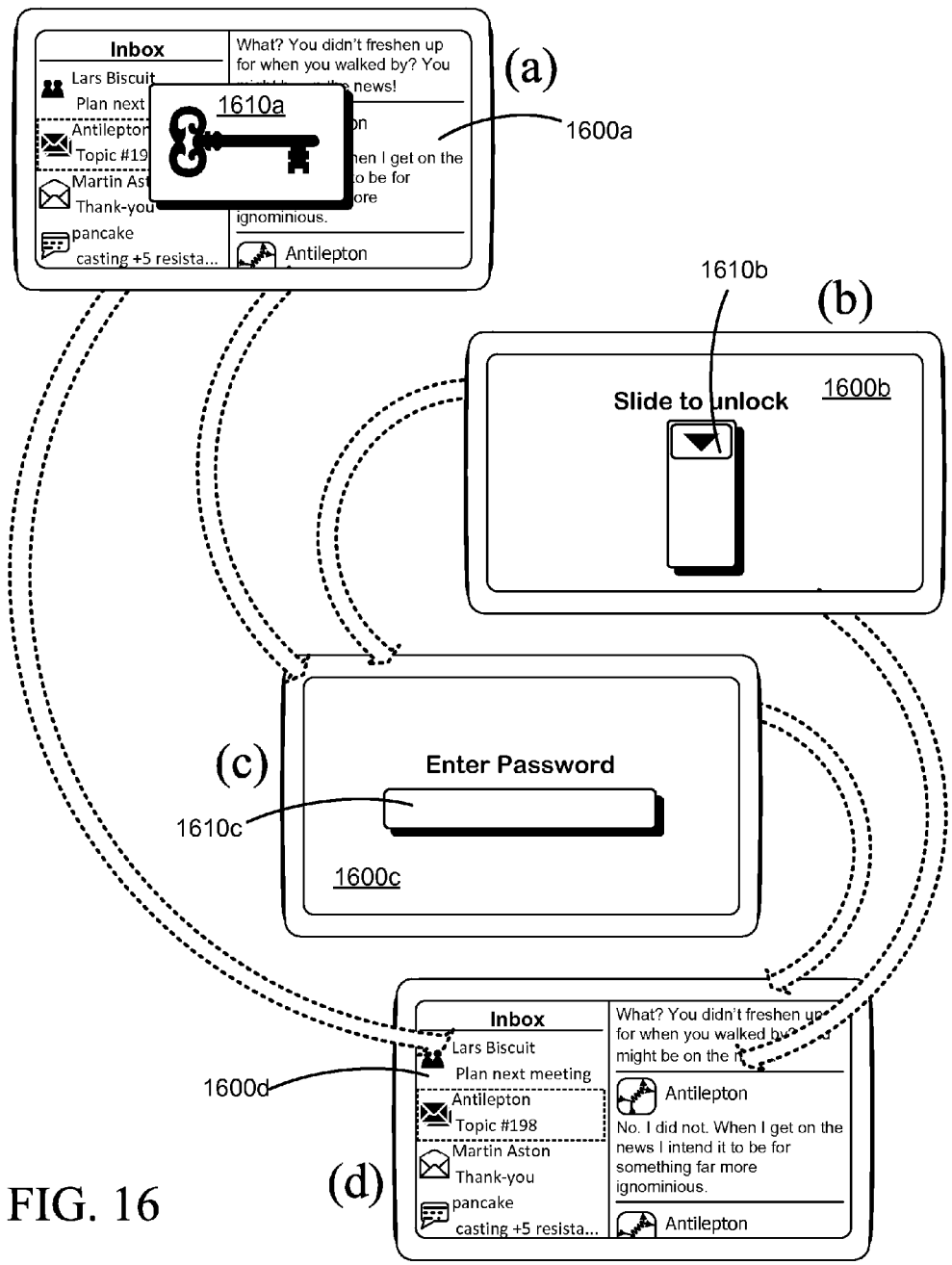
FIG. 16 illustrates example views for a lock screen forming part of a multiple-stage homescreen view.

Other variants of the lock or password panel are illustrated in FIGS. 16(*a*) to (*c*). In the example panel 1600*a* of FIG. 16(*a*), a lock panel is displayed including an optional notification 1610*a* indicating that the access to the panel is locked. Unlocking of the unified inbox panel merely requires a simple touch or other simple (i.e., non-password or code) input. Simply tapping the panel 1600*a* (e.g., in the area of the notification 1610*a*) would then result in the unified inbox panel 1500*a*' being displayed. (Although panels 1600*a* and 1500*a*' are shown in different screen orientations, it will be understood by those skilled in the art that these various views may of course be adapted for either orientation.)

In the example of FIG. 16(*a*), the message inbox contents may still be visible even though the inbox panel is locked. In a simple implementation, the inbox panel being "locked" means that further interaction with the inbox—for example, to select a message or view a message—requires some confirmatory action input while the panel 1600*a* is displayed. All other input events except for navigation to another homescreen panel may be disabled until the confirmatory action is received. Upon receipt of the confirmatory action, the notification 1610*a* is dismissed (if it was displayed), and any other input events detected by the device will be processed. In other implementations, the inbox contents may be displayed, but obfuscated (e.g., blurred, displayed with lower contrast, overlaid with a partially-transparent image).

As another example, a touch slide lock is provided on the intermediate panel, as shown in the panel 1600*b* of FIG. 16(*b*). The slide lock is "unlocked" by an input swipe gesture applied to the slide lock user interface element, usually in a direction specified by the element. Touch-based slide locks of this kind are known in the art. While this input is simple and does not require input of a more complex password or code, the deliberate swiping action required to reveal the unified inbox panel 1500*a*' decreases the likelihood that the unified inbox will be inadvertently revealed. This likelihood may be decreased still further if the slide lock may be oriented so that the requisite swipe gesture to "unlock" the slide lock is different from a swipe gesture used to navigate from panel to panel in the homescreen mode, as shown in FIG. 16(*b*) (if it is assumed that navigation between panels is horizontal, while the slide lock is oriented vertically). Furthermore, either the simple touch-lock panel 1600*a* or the slide lock panel 1600*b*, or any other similarly simple mechanism, may be combined with the password panel 1600*c*, as indicated by the arrows in FIG. 16; in response to the unlocking of an initial intermediate panel 1600*a* or 1600*b*, the mobile device 100 subsequently displays the intermediate password panel 1600*c* as shown in FIG. 16(*c*), and the correct password or other code must be input before access to the unified inbox panel is granted.

Figure 17:
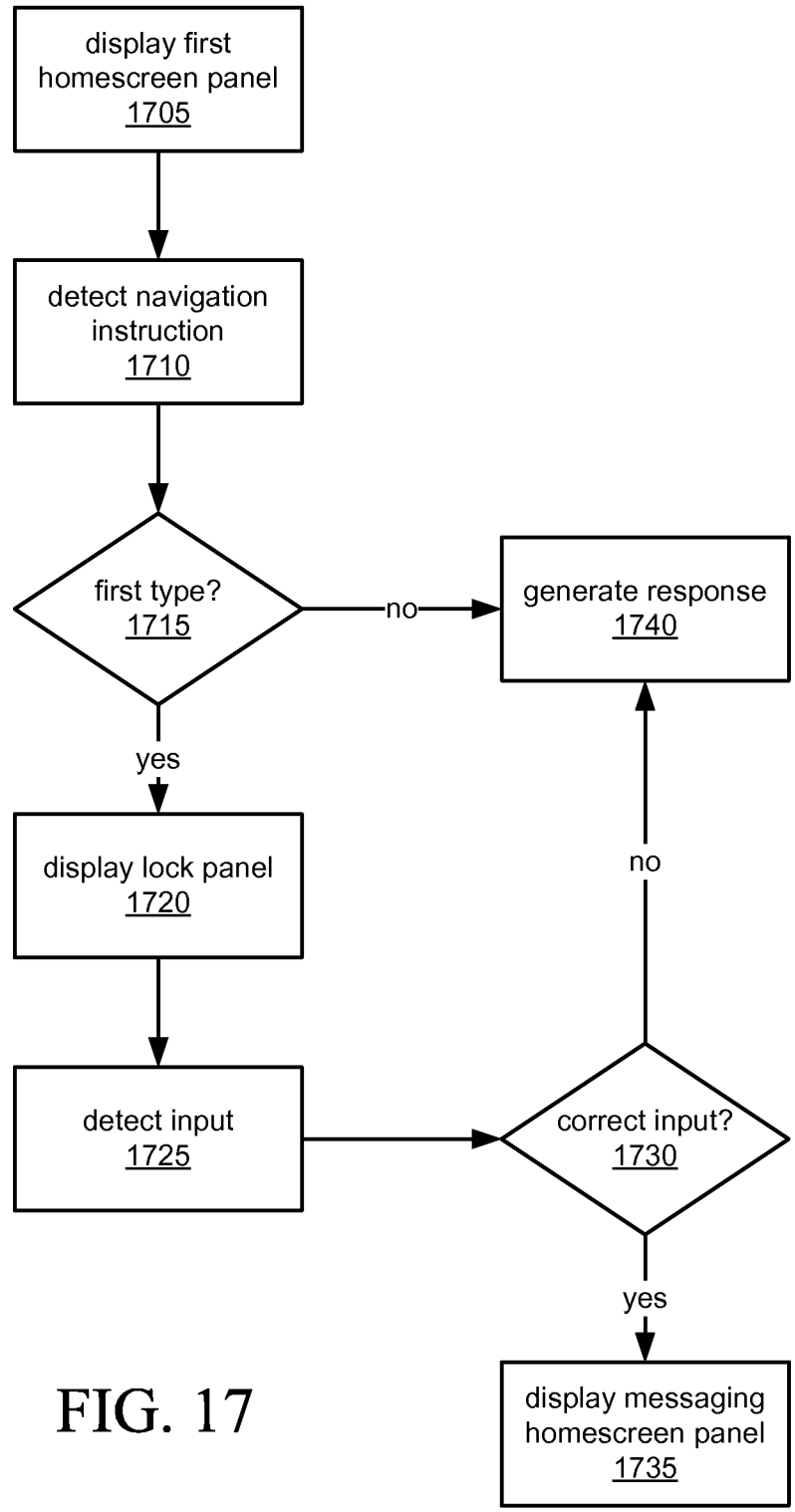
FIG. 17 is a flowchart illustrating an example method of navigating a multiple-stage homescreen with a lock screen.

FIG. 17 illustrates a method implementing the lock or password panel of FIG. 15. At 1705, the first homescreen panel is displayed. This may be, for instance, panel 1500*b*. At 1710, a navigation instruction is detected. If it is determined at 1715 not to be of the first type (i.e., not a command to navigate to another panel of the homescreen, and specifically the unified inbox panel), then an appropriate response is generated at 1740. If it is of the first type, then at 1720, the lock or password panel is displayed and input is awaited. At 1725, that input is detected. If it is determined at 1730 that the input was correct (e.g., in the case of a password entry, that the password matches a predetermined or previously-stored password; in the case of a simple lock mechanism, that the appropriate gesture or input was received), then at 1735 the unified inbox panel is displayed. However, if the input was not correct at 1730, then an appropriate response is generated at 1740. In the case of a simple lock mechanism, the response may simply be to wait for further input or for a timeout. In the case of a password-based lock, then the response may be an error message, and optionally incrementing of a counter of the number of failed attempts to access the unified inbox. In the event the counter exceeds a predefined limit, the mobile device 100 may automatically wipe some or all of its user data.

Figure 18A:
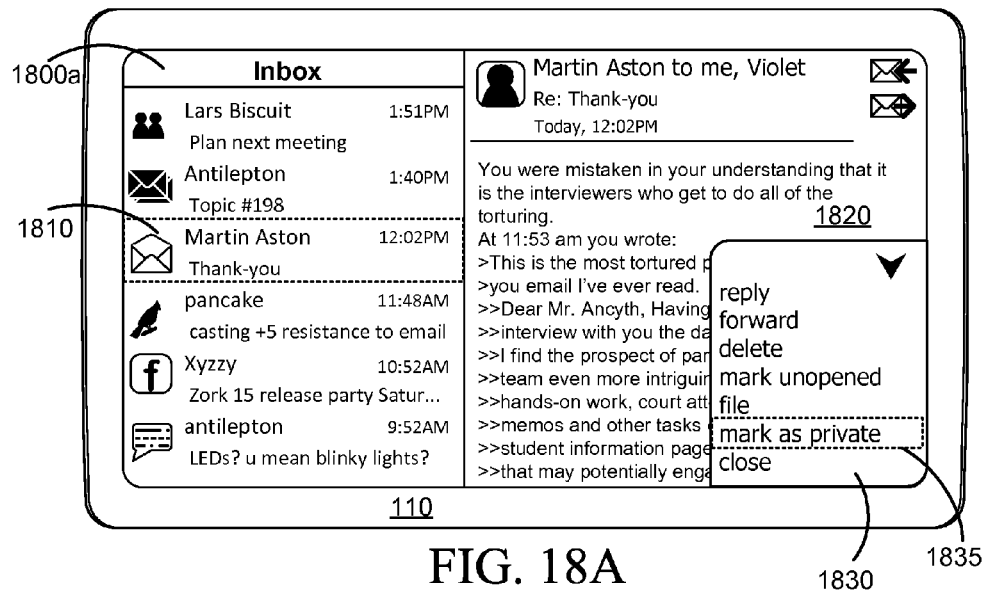
FIGS. 18A and 18B are example inbox views for tagging or categorizing a message as a private message.
Figure 18B:
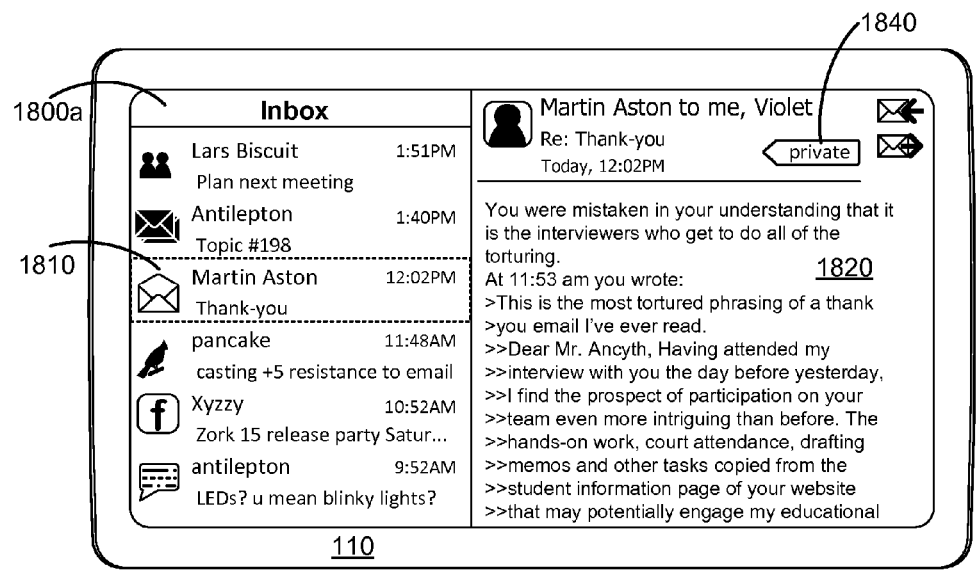

The above examples of FIGS. 15 to 17 provide a degree of security or privacy protection to the inbox panel. In still other examples, the security or privacy guard function can be applied on a more granular basis to individual messages displayable in the inbox panel. FIGS. 18A and 18B illustrate an example message display view in which a selected message can be marked as "private". In FIG. 18A, a first view of a unified inbox 1800*a* includes display of a message 1810 selected from a message listing. The selected message is displayed in the preview area 1820. An option is provided for the user to mark the message as private; in this case, a context menu 1830 is displayable with a number of options, including the selected "mark as private" option 1835. Selection of this option thus instructs the device to tag or categorize the message as "private" or "secure", or to associate the message with some other indicator indicating that the message is to be handled in the inbox as described below. Those skilled in the art will readily understand that designation of a message in this manner may be accomplished using other techniques, such as selectable user interface elements displayed with the message, application of rules to messages as they are received or after they are stored at the mobile device 100, and so on. Once the message has been so tagged or categorized, its designation may be visually indicated in the display of the message itself, as in the example view 1800*b* of FIG. 18B. In this example, a tag user interface element 1840 is displayed, showing that the message has been designated "private".

Figure 19:
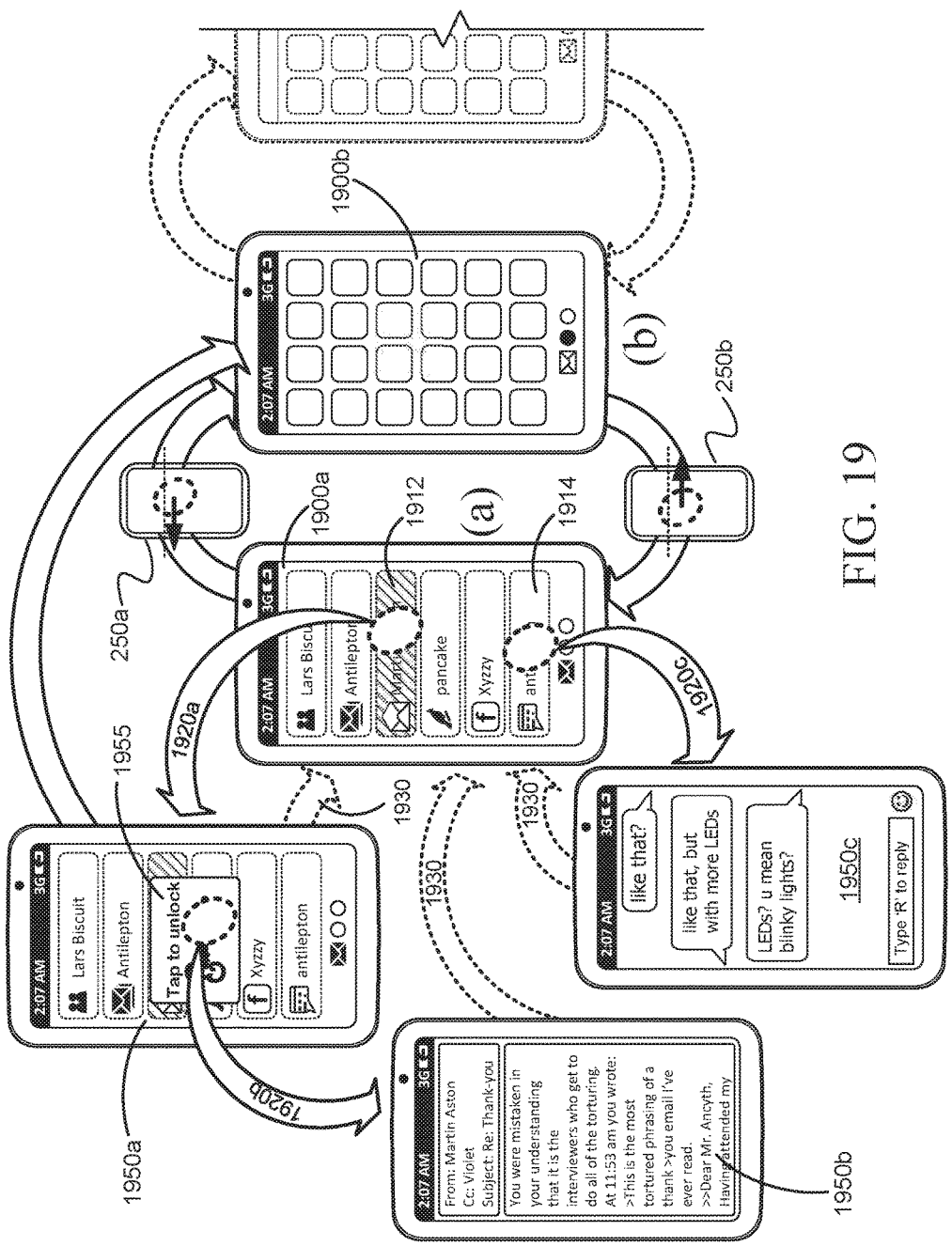
FIG. 19 is a schematic diagram illustrating message views and homescreen views including a messaging pane and lock dialog.

Messages that are designated in this manner are thereafter redacted when the message inbox panel of the homescreen is initially displayed. FIG. 19 illustrates a sequence of navigation between homescreen panels similar in concept to that shown in FIG. 15. Again, navigation between launchpad-type panels such as 1900*b*, or between a launchpad-type panel 1900*b* and an inbox panel, can be accomplished using a typical navigation command such as the swipe gesture 250*a* or 250*b*. In the example of FIG. 19, only one launchpad-type panel 1900*b* is shown, but it will be understood by those skilled in the art that there may be more than one such panel, and again, there may also be multitasking panels and other types of homescreen panels.

Unlike FIG. 15, when the user navigates from the last homescreen panel (e.g., 1900b) to the inbox panel 1900a, the message listing of the inbox is displayed and is made available for access and to receive input. However, only those messages not marked as "private" (or however that designation is indicated) are immediately selectable or interactable in the message inbox. Those messages that are marked as "private" are at least partially obfuscated or hidden from display in the inbox panel 1900a, and accessing those messages requires a further confirmatory step, such as the entry of a password or some other input as described above.

For instance, in FIG. 19, it can be seen that various messages listed in the inbox panel 1900a are visually distinguished. Message 1912, which is a designated message, is visually blurred or obfuscated, while other messages such as 1914 are not. Selection of the designated message 1912 (e.g., by a tap on that message listing entry, as indicated by the contact point and arrow 1920a) invokes an intermediate display of a lock or password dialog box 1955, as shown in view 1950a. Entry of the correct input at that stage, as indicated by contact point and arrow 1920b, results in display of the designated message content in view 1950b. On the other hand, when non-designated message 1914 is selected, as indicated by contact point and arrow 1920c, the message content is displayed in view 1950c without requiring any password entry or confirmatory input. Dismissal of any of views 1950a, 1950b or 1950c may return the inbox panel 1900a to the display, as indicated by arrows 1930.

Figure 20:
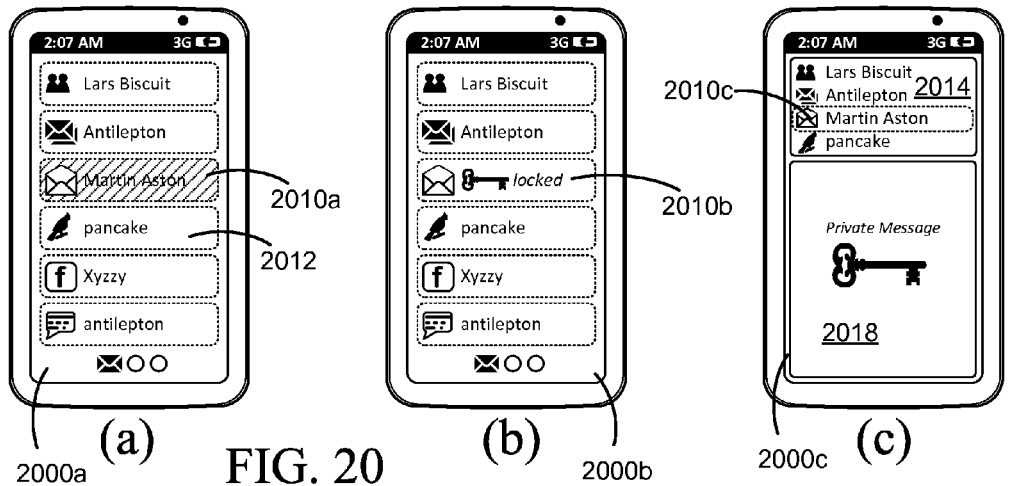
FIG. 20 illustrates example messaging views displayable in a homescreen mode.

Examples of obfuscation or redaction of designated messages in the inbox panel 1900a are shown in FIGS. 20(a) to (c). In the first example, inbox panel 2000a includes a listing of inbox messages, and merely visually blurs or shades the "private" message 2010a, leaving the remaining messages such as 2012 unobscured. Salient message header information or metadata, such as the sender/recipient name, timestamp, and/or subject line or message content preview, may still be included in the message listing. In the second example, inbox panel 2000b again includes the same listing, but the designated message 2010b is listed with less information that in FIG. 20(a). In the example of FIG. 20(b), the listing for the designated message 2010b simply includes an indication that the message is "locked". Alternatively, reduced information such as the sender/recipient name may be included in the listing, but other information normally displayed in the message listing is omitted. In the third example, which illustrates a message inbox including a message display area 2018, at least some header information or metadata for the designated message 2010c may be included in the message listing (e.g., sender/recipient name), but even when the message is selected, no message content is displayed in the display area 2018. Instead, a notification may be displayed that the message is "private" or "locked". Of course, more than one designated message may be included in the message listing, whether immediately visible in the inbox panel or not, and those other designated messages are treated the same way (for instance, the inbox panel may be scrollable so that other message listing entries can be displayed in the same obfuscated or redacted manner). In still another example, not illustrated, no designated messages are displayed in the message listing at all. Accessing those messages may require the user to invoke the individual messaging application associated with that designated message, or to select a menu option or other command to show designated messages.

Figure 21:
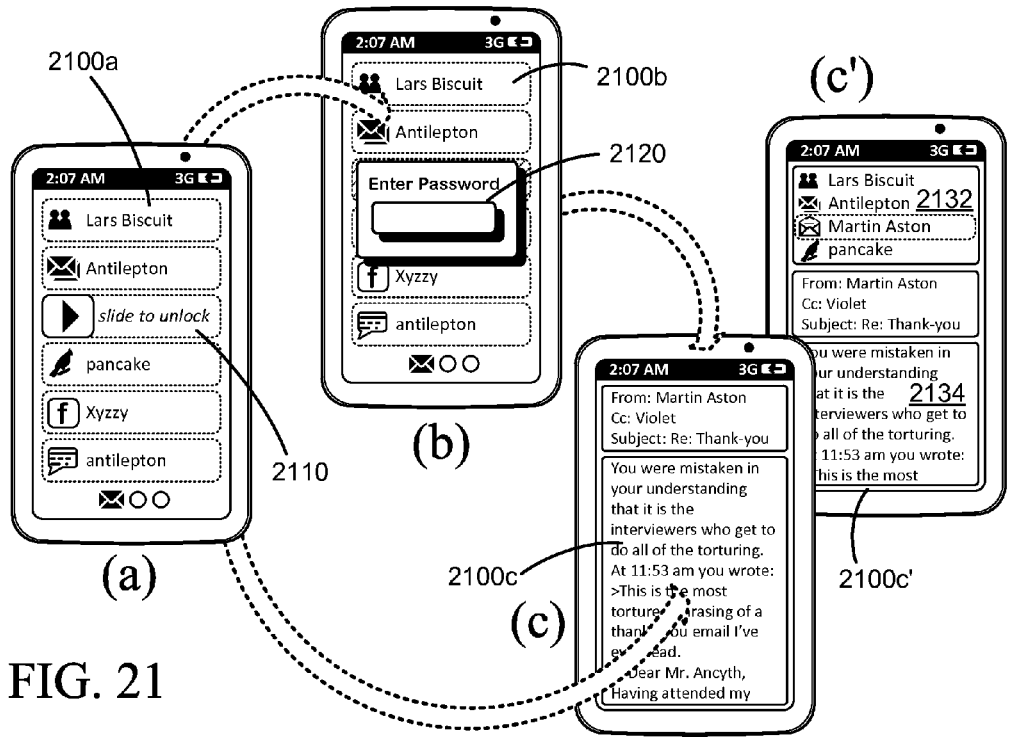
FIG. 21 is a schematic diagram illustrating homescreen and message views, and navigation between the views.

Still a further example of message listing display of a designated message is shown in FIG. 21, which also illustrates how a designated message can be displayed when it is selected from the inbox. In FIG. 21(a), the further example of the inbox panel 2100a is shown. In this case, a listing is included for the designated message 2110, but the usual message listing information is replaced with a slide lock user interface element 2110, such as type of slide lock introduced in FIG. 16(b) above. Correct actuation of the slide lock to "unlock" the message then invokes the display of the message, as in view 2100c. Alternatively, unlocking the message invokes an intermediate view 2100b, in which a password dialog interface 2120 is displayed; upon successful entry of the password, the message view 2100c is finally displayed. It will be appreciated by those skilled in the art that the various features and implementation details described in each example may be combined as appropriate with the features and details of other examples. For instance, the slide lock user interface element 2110 may be implemented in the combined message inbox listing-display area implementation of FIGS. 13A-13C, 16(d) and 20(c). Thus, the message view may resemble view 2100c' instead, which includes a message listing 2132 and a message display region 2134.

Figure 22:
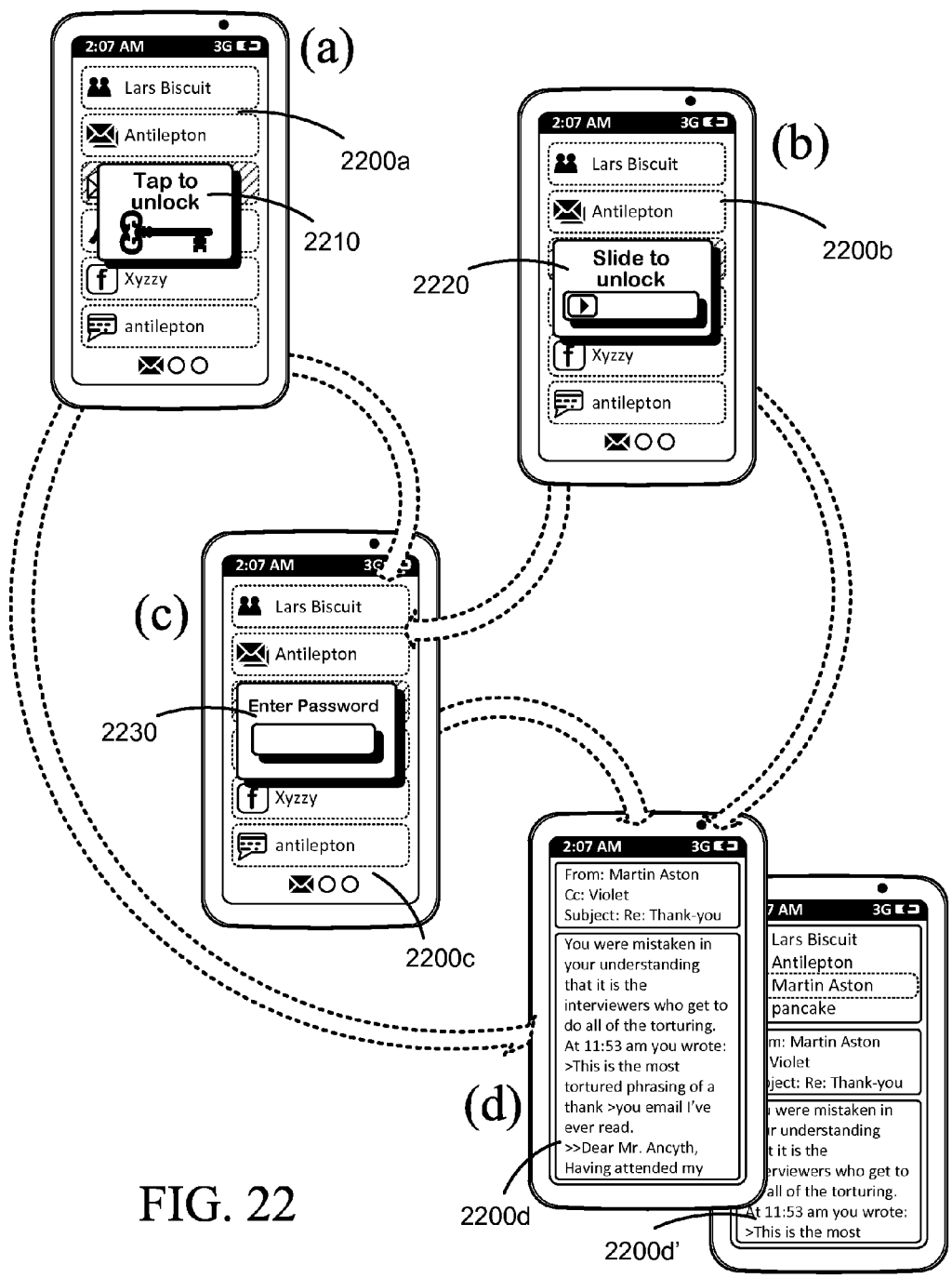
FIG. 22 is a further schematic diagram illustrating homescreen and message views, and navigation between the views.

FIGS. 22(a) to (d) illustrate the process of displaying a designated message from an initial inbox panel such as those shown in FIGS. 20(a)-(c). When a designated message, such as the message 2010a, 2010b, 2010c is selected for display, an intermediate user interface element 2210 (in view 2200a of FIG. 20(a)) or 2220 (in view 2200b of FIG. 22(b)) is first displayed. The first example of an intermediate element, 2210, is a notification that the message is locked, and optionally includes directions to unlock the message ("Tap to unlock"). The second example of an intermediate element, 2220, is a slide lock element as described above. The intermediate element 2210, 2220 may partially overlay or completely overlay or obscure the message inbox; in other examples, the intermediate element 2210, 2220 overlays or replaces the individual message listing entry for the selected designated message (similar to the placement of the slide lock user interface of FIG. 21(a)). Correct confirmatory input responsive to the intermediate element (in these examples, a tap or other touch event for the notification element 2210, and a swipe gesture operating on the slide lock element 2220) then invokes the display of the message content as usual, as indicated in FIG. 22(d), with either a fullscreen view of the message 2200d or a combination inbox listing-message view 2200d'. Again, the confirmatory input may instead invoke another intermediate view 2200c, including a user interface element 2230 for receiving password input, similar to that described above in respect of FIG. 16(c). Correct input of credentials at the intermediate view 2200c then results in display of the message view 2200d, 2200d'.

FIG. 23 illustrates a method implementing the message-level lock or password mechanism described in relation to FIGS. 19-22. At 2305, a first homescreen panel is displayed. This may be a launchpad-type panel such as 1900b. At 2310, a navigation instruction is detected, resulting in display of the inbox panel (such as panel 1900a) at 2315. The inbox panel displayed at this stage comprises a message listing including one or more designated messages. At 2320, selection of an entry of the displayed message listing is detected. If at 2325 it is determined that the message selected is not a designated message, then at 2345 a responsive message action, such as displaying the message, is taken. If the message is indeed a designated message, then at 2330 a lock element is displayed. This lock element may be the aforementioned notification 2210 or slide lock element 2220, or some other appropriate user interface element indicating that some level of protection has been applied to the selected message. At 2335, an input is detected. If that input is detected at 2340 to be an appropriate confirmatory action (e.g., a tap in response to the notification element 2210, the appropriate swipe on the slide lock element 2220) or a correct password entry, then at 2345 the message is displayed. If, however, the message is not a confirmatory action or correct password, then at 2350 an appropriate response is generated. In some instances, the response may be to wait until a further input is detected, or to return to the initial inbox panel display; in others, an error or warning message may be displayed (in the event an incorrect password is entered, for example). If the detected input is a navigation command of the first type, used to navigate from panel to panel within the mode, then the appropriate response may be to display an adjacent panel of the homescreen. Thus, homescreen access to messages may be selectively blocked and optionally secured using credentials, without requiring the entire message inbox or the entire homescreen to be similarly secured.

Accordingly, there is provided a method implemented by an electronic device, the method comprising: displaying a plurality of views of a homescreen mode of the electronic device, the plurality of views comprising a fullscreen view for a first application executing on the electronic device and at least one launch view comprising a plurality of graphical user interface elements each associated with a corresponding application entry point.

In one aspect, the first application is a messaging application. The messaging application may be a unified message box application. The messaging application may comprise messages for a plurality of message formats and/or messaging services. Further, the fullscreen view may comprise a message listing. The fullscreen view may additionally or alternatively comprise a message viewing region for displaying content of at least one message. This at least one message may be a selected message of the message listing. The fullscreen view may further comprise a reply input field for receiving reply message content for a selected message.

In a further aspect, the method may further comprise receiving input content in the reply input field; constructing a reply message comprising the received reply message content for the selected message; and transmitting the reply message.

In another aspect, all of the plurality of panels are sequentially navigable using one type of navigation command. Applications other than the first application may be invoked using a second type of navigation command. Still further, one of the corresponding application entry points may be actuatable to invoke the first application.

In still another aspect, the plurality of panels is displayed on a touchscreen of the electronic device.

There is also provided a method implemented by an electronic device, the method comprising: defining a plurality of views of a homescreen mode of the electronic device, the plurality of views comprising a fullscreen view for a first application executing on the electronic device and at least one launch view comprising a plurality of graphical user interface elements each associated with a corresponding application entry point; while in the homescreen mode, and in response to a navigation instruction of a first class received while a first one of the plurality of views of the homescreen mode is displayed, displaying a further one of the plurality of views of the homescreen mode, wherein either the first one or the further one of the plurality of views is the fullscreen view for the first application.

There is also provided an electronic device-readable medium, which may be physical or non-transitory, bearing or storing code which, when executed by at least one processor of a suitable electronic device, causes the device to implement one or more of the methods and variants described herein.

There is also provided an electronic device, which may be a mobile device, adapted to implement the methods and variants described herein. The electronic device may include all or only select features of the example electronic device described herein.

In various aspects, which may be combined, the first application is a messaging application; the fullscreen view for the first application includes a listing of messages received at or sent from the electronic device; the fullscreen view includes a preview of message content for a selected one of the messages; the fullscreen view includes an input field for receiving input content for a reply message to a selected one of the messages; wherein the first application is a messaging application and the fullscreen view includes an input field for receiving input content for a message to be sent from the electronic device, the method further comprising: while in the homescreen mode, displaying the view comprising the fullscreen view for the first application; receiving input content in the input field; and sending a message comprising the input content.

In other aspects, which may be combined, the messaging application is a unified inbox application; the plurality of views of the homescreen mode includes a multitasking view comprising a reduced-size view of at least one other application executing on the electronic device; the plurality of views includes a lock or password view displayed as an intermediate view while navigating to the fullscreen view of the first application from another view of the homescreen mode.

While a unified messaging application or function is used in the examples described herein, it will be appreciated by those skilled in the art that views of other types of applications or functions, such as a dedicated (not unified) messaging application, calendar, and so forth, may be provided in the panel instead. However, a view of a messaging application, such as the unified messaging application in particular, affords the user the ability to interact with messaging functions on the device—including not only viewing messages, but also composing and sending messages—from the homescreen, and while the device is operating in a homescreen mode.

It should be understood that steps and the order of the steps in the processing described herein may be altered, modified and/or augmented and still achieve the desired outcome. Throughout the specification, terms such as "may" and "can" are used interchangeably and use of any particular term should not be construed as limiting the scope or requiring experimentation to implement the claimed subject matter or embodiments described herein. Further, the various features and adaptations described in respect of one example or embodiment in this disclosure can be used with other examples or embodiments described herein, as would be understood by the person skilled in the art.

The systems' and methods' data may be stored in one or more data stores. The data stores can be of many different types of storage devices and programming constructs, such as RAM, ROM, flash memory, programming data structures, programming variables, etc. It is noted that data structures describe formats for use in organizing and storing data in databases, programs, memory, or other computer-readable media for use by a computer program.

Code adapted to provide the systems and methods described above may be provided on many different types of computer-readable media including computer storage mechanisms (e.g., CD-ROM, diskette, RAM, flash memory, computer's hard drive, etc.) that contain instructions for use in execution by a processor to perform the methods' operations and implement the systems described herein.

The computer components, software modules, functions and data structures described herein may be connected directly or indirectly to each other in order to allow the flow of data needed for their operations. Various functional units described herein have been expressly or implicitly described as modules and agents, in order to more particularly emphasize their independent implementation and operation. It is also noted that an agent, module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The various functional units may be implemented in hardware circuits such as custom VLSI circuits or gate arrays; field-programmable gate arrays; programmable array logic; programmable logic devices; commercially available logic chips, transistors, and other such components. Modules implemented as software for execution by a processor or processors may comprise one or more physical or logical blocks of code that may be organized as one or more of objects, procedures, or functions. The modules need not be physically located together, but may comprise code stored in different locations, such as over several memory devices, capable of being logically joined for execution. Modules may also be implemented as combinations of software and hardware, such as a processor operating on a set of operational data or instructions.

A portion of the disclosure of this patent document contains material which is or may be subject to one or more of copyright, design patent, industrial design, or unregistered design protection. The rights holder has no objection to the reproduction of any such material as portrayed herein through facsimile reproduction of the patent document or patent disclosure, as it appears in the Patent and Trademark Office patent file or records, but otherwise reserves all rights whatsoever.

The invention claimed is:

1. A method implemented by an electronic device, the method comprising:
sequentially displaying, on a display of the electronic device, a plurality of panels of a homescreen of the electronic device, the plurality of panels comprising:
a panel comprising a fullscreen view for a unified inbox application on the electronic device;
when a plurality of applications is executing in a multitasking mode on the electronic device, a fullscreen multitasking panel comprising one or more reduced-size views of the applications executing in the multitasking mode on the electronic device, the fullscreen multitasking panel being excluded from the plurality of panels when no application other than the unified inbox application is executing in the multitasking mode; and
a plurality of fullscreen launch panels comprising a plurality of graphical user interface elements, each of the plurality of graphical user interface elements being associated with a corresponding application entry point, wherein sequentially displaying the plurality of panels comprises:
displaying a first fullscreen launch panel of the plurality of fullscreen launch panels;
when a directional swipe gesture in a first direction is detected on the first fullscreen launch panel, displaying the fullscreen multitasking panel in place of the first fullscreen launch panel when the fullscreen multitasking panel is included in the plurality of panels, and displaying the fullscreen view for the unified inbox application when the fullscreen multitasking panel is excluded from the plurality of panels; and
when a directional swipe gesture in a second direction opposite to the first direction is detected on the first fullscreen launch panel, displaying a second fullscreen launch panel of the plurality of fullscreen launch panels.

2. The method of claim 1, wherein the fullscreen view for the unified inbox application comprises a message viewing region for displaying content of at least one message.

3. The method of claim 2, wherein the fullscreen view for the unified inbox application further comprises a reply input field for receiving reply message content for a selected message.

4. The method of claim 3, further comprising: receiving input content in the reply input field; constructing a reply message comprising the received reply message content for the selected message; and transmitting the reply message.

5. The method of claim 1, wherein the unified inbox application displays messages for a plurality of message formats, a plurality of messaging services, or a plurality of both message formats and messaging services.

6. The method of claim 1, wherein one of the corresponding application entry points is actuatable to invoke the unified inbox application.

7. An electronic device, including:
a display;
at least one processor, the at least one processor being configured to enable:
sequentially displaying, on the display, a plurality of panels of a homescreen, the plurality of panels comprising:
a panel comprising a fullscreen view for a unified inbox application on the electronic device;
when at least one application other than the unified inbox application is executing in a multitasking mode on the electronic device, a fullscreen multitasking panel comprising one or more reduced-size views of the applications executing in the multitasking mode on the electronic device, the fullscreen multitasking panel being excluded from the plurality of panels when no application other than the unified inbox application is executing in the multitasking mode; and
a plurality of fullscreen launch panels comprising a plurality of graphical user interface elements, each of the plurality of graphical user interface elements being associated with a corresponding application entry point,
wherein sequentially displaying the plurality of panels comprises:
displaying a first fullscreen launch panel of the plurality of fullscreen launch panels;
when a directional swipe gesture in a first direction is detected on the first fullscreen launch panel, displaying the fullscreen multitasking panel in place of the first fullscreen launch panel when the fullscreen multitasking panel is included in the plurality of panels, and displaying the fullscreen view for the unified inbox application when the fullscreen multitasking panel is excluded from the plurality of panels; and when a directional swipe gesture in a second direction opposite to the first direction is detected on the first fullscreen launch panel, displaying a second fullscreen launch panel of the plurality of fullscreen launch panels.

8. The electronic device of claim 7, wherein the fullscreen view for the unified inbox application comprises a message viewing region for displaying content of at least one message.

9. The electronic device of claim 8, wherein the fullscreen view further comprises a reply input field for receiving reply message content for a selected message.

10. The electronic device of claim 9, wherein the at least one processor:
receives input content in the reply input field via an input subsystem;
constructs a reply message comprising the received reply message content for the selected message; and
initiates transmission of the reply message.

11. The electronic device of claim 7, wherein the unified inbox application displays messages for a plurality of message formats, a plurality of messaging services, or a plurality of both message formats and messaging services.

12. The electronic device of claim 7, wherein one of the corresponding application entry points is actuatable to invoke the unified inbox application.

13. A non-transitory electronic device-readable medium bearing code which, when executed by at least one processor of an electronic device, causes the electronic device to implement the method of:

sequentially displaying, on a display of the electronic device, a plurality of panels of a homescreen of the electronic device, the plurality of panels comprising:
a panel comprising a fullscreen view for a unified inbox application executing on the electronic device;
when at least one application other than the unified inbox application is executing in a multitasking mode on the electronic device, a fullscreen multitasking panel comprising one or more reduced-size views of the applications executing in a multitasking mode on the electronic device, the fullscreen multitasking panel being excluded from the plurality of panels when no application other than the unified inbox application is executing in the multitasking mode; and
a plurality of fullscreen launch panels comprising a plurality of graphical user interface elements, each of the plurality of graphical user interface elements being associated with a corresponding application entry point, wherein sequentially displaying the plurality of panels comprises:
displaying a first fullscreen launch panel of the plurality of fullscreen launch panels;
when a directional swipe gesture in a first direction is detected on the first fullscreen launch panel, displaying the fullscreen multitasking panel in place of the first fullscreen launch panel when the fullscreen multitasking panel is included in the plurality of panels, and displaying the fullscreen view for the unified inbox application when the fullscreen multitasking panel is excluded from the plurality of panels; and
when a directional swipe gesture in a second direction opposite to the first direction is detected on the first fullscreen launch panel, displaying a second fullscreen launch panel of the plurality of fullscreen launch panels.

* * * * *